US009654536B2

(12) United States Patent
Coburn, IV

(10) Patent No.: US 9,654,536 B2
(45) Date of Patent: May 16, 2017

(54) CLOUD QUEUE PLAYBACK POLICY

(71) Applicant: Sonos, Inc., Santa Barbara, CA (US)

(72) Inventor: Arthur L. Coburn, IV, Lexington, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 14/616,341

(22) Filed: Feb. 6, 2015

(65) Prior Publication Data

US 2015/0358380 A1     Dec. 10, 2015

Related U.S. Application Data

(60) Provisional application No. 62/007,906, filed on Jun. 4, 2014.

(51) Int. Cl.
*G06F 17/00*     (2006.01)
*H04L 29/06*     (2006.01)
(Continued)

(52) U.S. Cl.
CPC ............ *H04L 65/602* (2013.01); *G05B 15/02* (2013.01); *G06F 3/16* (2013.01); *G06F 3/165* (2013.01); *G06F 17/30058* (2013.01); *H04H 60/80* (2013.01); *H04L 41/22* (2013.01); *H04L 63/08* (2013.01); *H04L 63/105* (2013.01); *H04L 65/1003* (2013.01); *H04L 65/4069* (2013.01);
(Continued)

(58) Field of Classification Search
CPC ......... G06F 17/30017; G06F 17/30053; G06F 17/3074; G06F 3/0482; G06F 3/165; H04N 21/4307; H04N 21/4825; H04N 21/42204; H04N 21/43615; H04L 12/2805; H04L 12/282; H04L 2015/2841; H04L 2015/2849
See application file for complete search history.

(56) References Cited

U.S. PATENT DOCUMENTS 5,440,644 A     8/1995   Farinelli et al.
5,761,320 A     6/1998   Farinelli et al.
(Continued)

FOREIGN PATENT DOCUMENTS

EP     1389853 A1     2/2004
WO     0153994        7/2001
(Continued)

OTHER PUBLICATIONS

"AudioTron Quick Start Guide, Version 1.0", Voyetra Turtle Beach, Inc., Mar., 2001, 24 pages.
(Continued)

*Primary Examiner* — Andrew C Flanders
(74) *Attorney, Agent, or Firm* — McDonnell Boehnen Hulbert & Berghoff LLP

(57) ABSTRACT

An example implementation may involve a computing system receiving, from a media playback system, at least one request for an indication of one or more media items from a queue of media items. The implementation may also involve the computing system identifying one or more playback policies that are associated with the queue of media items. Each of the one or more playback policies may restrict at least one aspect of playback of at least one of the one or more media items. The implementation may further involve the computing system sending, to the media playback system, an indication of the identified one or more playback policies.

19 Claims, 20 Drawing Sheets

(51) Int. Cl.

| | | |
|---|---|---|
| H04L 29/08 | (2006.01) | |
| G06F 3/16 | (2006.01) | |
| G05B 15/02 | (2006.01) | |
| G06F 17/30 | (2006.01) | |
| H04H 60/80 | (2008.01) | |
| H04L 12/24 | (2006.01) | |
| H04R 27/00 | (2006.01) | |
| H04N 21/258 | (2011.01) | |
| H04N 21/262 | (2011.01) | |
| H04N 21/432 | (2011.01) | |
| H04N 21/436 | (2011.01) | |
| H04N 21/482 | (2011.01) | |
| H04N 21/6377 | (2011.01) | |
| H04N 21/654 | (2011.01) | |
| H04N 21/658 | (2011.01) | |
| H04N 21/81 | (2011.01) | |
| H04N 21/845 | (2011.01) | |

(52) U.S. Cl.
CPC .......... *H04L 65/4084* (2013.01); *H04L 65/60* (2013.01); *H04L 65/608* (2013.01); *H04L 67/10* (2013.01); *H04L 67/1095* (2013.01); *H04L 67/12* (2013.01); *H04L 67/325* (2013.01); *H04N 21/25816* (2013.01); *H04N 21/26258* (2013.01); *H04N 21/4325* (2013.01); *H04N 21/43615* (2013.01); *H04N 21/4825* (2013.01); *H04N 21/6377* (2013.01); *H04N 21/654* (2013.01); *H04N 21/658* (2013.01); *H04N 21/8113* (2013.01); *H04N 21/8455* (2013.01); *H04R 27/00* (2013.01); *H04R 2227/005* (2013.01)

(56) References Cited

U.S. PATENT DOCUMENTS

| | | |
|---|---|---|
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,587,127 B1 | 7/2003 | Leeke et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,797,446 B2 | 9/2010 | Heller et al. |
| 7,805,682 B1 | 9/2010 | Lambourne |
| 7,827,259 B2 | 11/2010 | Heller et al. |
| 7,853,341 B2 | 12/2010 | McCarty et al. |
| 7,958,441 B2 | 6/2011 | Heller et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,204,890 B1 | 6/2012 | Gogan |
| 8,234,395 B2 | 7/2012 | Millington |
| 8,483,853 B1 | 7/2013 | Lambourne |
| 8,516,093 B2 | 8/2013 | Bank |
| 8,818,538 B2 | 8/2014 | Sakata |
| 9,226,013 B2 | 12/2015 | Fishwick |
| 9,363,254 B2 | 6/2016 | Beckhardt et al. |
| 9,363,255 B2 | 6/2016 | Coburn, IV |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2004/0139222 A1 | 7/2004 | Slik et al. |
| 2005/0240661 A1 | 10/2005 | Heller et al. |
| 2007/0038999 A1 | 2/2007 | Millington |
| 2007/0142944 A1 | 6/2007 | Goldberg et al. |
| 2007/0219910 A1 | 9/2007 | Martinez |
| 2008/0177822 A1 | 7/2008 | Yoneda |
| 2008/0229215 A1 | 9/2008 | Baron et al. |
| 2009/0087167 A1 | 4/2009 | Seisun et al. |
| 2010/0075313 A1 | 3/2010 | Kreuwel et al. |
| 2011/0004330 A1 | 1/2011 | Rothkopf et al. |
| 2011/0040658 A1 | 2/2011 | Gautier et al. |
| 2011/0161485 A1 | 6/2011 | George et al. |
| 2011/0307927 A1 | 12/2011 | Nakano et al. |
| 2012/0005380 A1 | 1/2012 | Batson et al. |
| 2012/0088477 A1 | 4/2012 | Cassidy |
| 2012/0089910 A1 | 4/2012 | Cassidy |
| 2012/0290932 A1 | 11/2012 | Johnson |
| 2013/0073584 A1 | 3/2013 | Kuper et al. |
| 2013/0188924 A1 | 7/2013 | Morris |
| 2013/0219178 A1 | 8/2013 | Xiques et al. |
| 2013/0253679 A1 | 9/2013 | Lambourne |
| 2013/0317635 A1 | 11/2013 | Bates et al. |
| 2013/0326041 A1 | 12/2013 | Bellet et al. |
| 2013/0346859 A1 | 12/2013 | Bates et al. |
| 2014/0074959 A1 | 3/2014 | Alsina et al. |
| 2014/0075308 A1 | 3/2014 | Sanders et al. |
| 2014/0075513 A1 | 3/2014 | Trammel et al. |
| 2014/0123006 A1 | 5/2014 | Chen et al. |
| 2014/0189648 A1 | 7/2014 | Everitt |
| 2014/0282772 A1 | 9/2014 | Chen et al. |
| 2015/0098576 A1 | 4/2015 | Sundaresan et al. |

FOREIGN PATENT DOCUMENTS

| | | |
|---|---|---|
| WO | 03093950 A2 | 11/2003 |
| WO | 2012115742 A1 | 8/2012 |
| WO | 2014039163 A1 | 3/2014 |

OTHER PUBLICATIONS

"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
"Bluetooth. "Specification of the Bluetooth System: The ad hoc SCATTERNET for affordable and highly functional wireless connectivity" Core, Version 1.0 a, 26 Jul. 1999, 1068 pages."
"Bluetooth. "Specification of the Bluetooth System: Wireless connections made easy" Core, Version 1.0 B, Dec. 1, 1999, 1076 pages."
"Dell, Inc. "Dell Digital Audio Receiver: Reference Guide" Jun. 2000, 70 pages."
"Dell, Inc. "Start Here" Jun. 2000, 2 pages."
Jo J., et al., "Synchronized One-to-many Media Streaming with Adaptive Playout Control," Proceedings of SPIE, 2002, vol. 4861, pp. 71-82.
"Jones, Stephen. "Dell Digital Audio Receiver: Digital upgrade for your analog stereo" Analog Stereo. Jun. 24, 2000 < http://www.reviewsonline.com/articles/961906864.htm> retrieved Jun. 18, 2014, 2 pages".
"Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages".
"Palm, Inc. "Handbook for the Palm VII Handheld" May 2000, 311 pages".
"Presentations at WinHEC 2000" May 2000, 138 pages.

(56) References Cited

OTHER PUBLICATIONS

"UPnP; "Universal Plug and Play Device Architecture"; Jun. 8, 2000; version 1.0; Microsoft Corporation; pp. 1-54".
International Searching Authority, International Search Report and Written Opinion mailed on Sep. 7, 2015, issued in connection with International Application No. PCT/US2015/033008, filed on May 28, 2015, 19 pages.
International Searching Authority, International Search Report and Written Opinion mailed on Aug. 12, 2015, issued in connection with International Application No. PCT/US2015/031930, filed on May 21, 2015, 12 pages.
International Searching Authority, International Search Report and Written Opinion mailed on Aug. 27, 2015, issued in connection with International Application No. PCT/US2015/033003, filed on May 28, 2015, 20 pages.
Pre-Interview First Office Action mailed on Feb. 23, 2016, issued in connection with U.S. Appl. No. 14/616,364, filed Feb. 6, 2015, 5 pages.
Pre-Interview First Office Action mailed on Feb. 24, 2016, issued in connection with U.S. Appl. No. 14/616,325, filed on Feb. 6, 2015, 5 pages.
International Searching Authority, International Search Report and Written Opinion mailed on Jul. 20, 2015 (received on Apr. 14, 2016), issued in connection with International Application No. PCT/US2015/031756, filed on May 20, 2015, 12 pages.
Notice of Allowance mailed on Apr. 7, 2016, issued in connection with U.S. Appl. No. 14/616,325, filed Feb. 6, 2015, 5 pages.
Notice of Allowance mailed on Apr. 8, 2016, issued in connection with U.S. Appl. No. 14/616,364, filed Feb. 6, 2015, 6 pages.
Preinterview First Office Action mailed on Apr. 20, 2016, issued in connection with U.S. Appl. No. 14/616,310, filed Feb. 6, 2015, 21 pages.
Preinterview First Office Action mailed on Apr. 21, 2016, issued in connection with U.S. Appl. No. 14/616,332, filed Feb. 6, 2015, 20 pages.
Pre-Interview First Office Action mailed on Mar. 29, 2016, issued in connection with U.S. Appl. No. 14/616,319, filed Feb. 6, 2015, 5 pages.
Corrected Notice of Allowability mailed on Aug. 25, 2016, issued in connection with U.S. Appl. No. 14/616,332, filed Feb. 6, 2015, 2 pages.
First Action Interview Office Action mailed on Aug. 18, 2016, issued in connection with U.S. Appl. No. 14/485,602, filed Sep. 12, 2014, 15 pages.
Non-Final Office Action mailed on Sep. 12, 2016, issued in connection with U.S. Appl. No. 14/475,093, filed Sep. 2, 2014, 26 pages.
Notice of Allowance mailed on Jul. 18, 2016, issued in connection with U.S. Appl. No. 14/616,332, filed Feb. 6, 2015, 7 pages.
Preinterview First Office Action mailed on Jul. 15, 2016, issued in connection with U.S. Appl. No. 14/485,602, filed Sep. 12, 2014, 6 pages.
Final Office Action mailed on Nov. 3, 2016, issued in connection with U.S. Appl. No. 14/616,319, filed Feb. 6, 2015, 23 pages.
Final Office Action mailed on Oct. 19, 2016, issued in connection with U.S. Appl. No. 14/475,093, filed Sep. 2, 2014, 30 pages.
Non-Final Office Action mailed on Oct. 17, 2016, issued in connection with U.S. Appl. No. 15/099,846, filed Aug. 15, 2016, 6 pages.
Non-Final Office Action mailed on Sep. 23, 2016, issued in connection with U.S. Appl. No. 15/130,672, filed Apr. 15, 2016, 6 pages.
First Action Interview Office Action mailed on Jun. 10, 2016, issued in connection with U.S. Appl. No. 14/616,319, filed Feb. 6, 2015, 7 pages.
Notice of Allowance mailed on Jul. 1, 2016, issued in connection with U.S. Appl. No. 14/616,310, filed Feb. 6, 2015, 9 pages.
Advisory Action mailed on Jan. 12, 2017, issued in connection with U.S. Appl. No. 14/475,093, filed Sep. 2, 2014, 11 pages.
Corrected Notice of Allowability mailed on Nov. 29, 2016, issued in connection with U.S. Appl. No. 14/616,310, filed Feb. 6, 2015, 6 pages.
"Denon 2003-2004 Product Catalog," Denon, 2003-2004, 44 pages.
International Bureau, International Preliminary Report on Patentability mailed on Dec. 15, 2016, issued in connection with International Application No. PCT/US2015/031756, filed on May 20, 2015, 9 pages.
International Bureau, International Preliminary Report on Patentability mailed on Dec. 15, 2016, issued in connection with International Application No. PCT/US2015/031930, filed on May 21, 2015, 9 pages.
International Bureau, International Preliminary Report on Patentability mailed on Dec. 15, 2016, issued in connection with International Application No. PCT/US2015/033003, filed on May 28, 2015, 17 pages.
International Bureau, International Preliminary Report on Patentability mailed on Dec. 15, 2016, issued in connection with International Application No. PCT/US2015/033008, filed on May 28, 2015, 16 pages.
Notice of Allowance mailed on Jan. 3, 2017, issued in connection with U.S. Appl. No. 15/099,846, filed Apr. 15, 2016, 5 pages.
Notice of Allowance mailed on Jan. 3, 2017, issued in connection with U.S. Appl. No. 15/130,672, filed Apr. 15, 2016, 5 pages.
Notice of Allowance mailed on Jan. 5, 2017, issued in connection with U.S. Appl. No. 14/616,332, filed Feb. 6, 2015, 5 pages.
Notice of Allowance mailed on Nov. 23, 2016, issued in connection with U.S. Appl. No. 14/485,602, filed Sep. 12, 2014, 9 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Non-Final Office Action mailed on Feb. 1, 2017, issued in connection with U.S. Appl. No. 14/616,319, filed Feb. 6, 2015, 26 pages.

| PLAYBACK QUEUE ||
|---|---|
| MEDIA ITEM | POSITION |
| Song A | 1 |
| Song B | 2 |
| Song C | 3 |
| Song D | 4 |
| Song E | 5 |
| Song F | 6 |
| Song G | 7 |
| Song H | 8 |
| Song I | 9 |
| Song J | 10 |
| Song K | 11 |
| Song L | 12 |
| Song M | 13 |
| Song N | 14 |
| Song O | 15 |
| Song P | 16 |

FIGURE 7

CLOUD QUEUE PLAYBACK POLICY

CROSS REFERENCE TO RELATED APPLICATIONS

This application claims priority to U.S. Provisional Patent Application Ser. No. 62/007,906 filed Jun. 4, 2014, entitled "Cloud Queue," which is incorporated herein in its entirety. This application is related to the following applications filed on the same day as the present application, the contents of each are incorporated by reference herein: entitled "Cloud Queue Access Control," U.S. application Ser. No. 14/616, 310 filed Feb. 6, 2015; entitled "Cloud Queue Access Control," U.S. application Ser. No. 14/616,319 filed Feb. 6, 2015; entitled "Cloud Queue Access Control," U.S. application Ser. No. 14/616,325 filed Feb. 6, 2015; entitled "Cloud Queue Sync Protocol," U.S. application Ser. No. 14/616,332 filed Feb. 6, 2015; entitled "Cloud Queue Playhead," U.S. application Ser. No. 14/616,364 filed Feb. 6, 2015.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 7 is an example playback queue;

Figure 1:
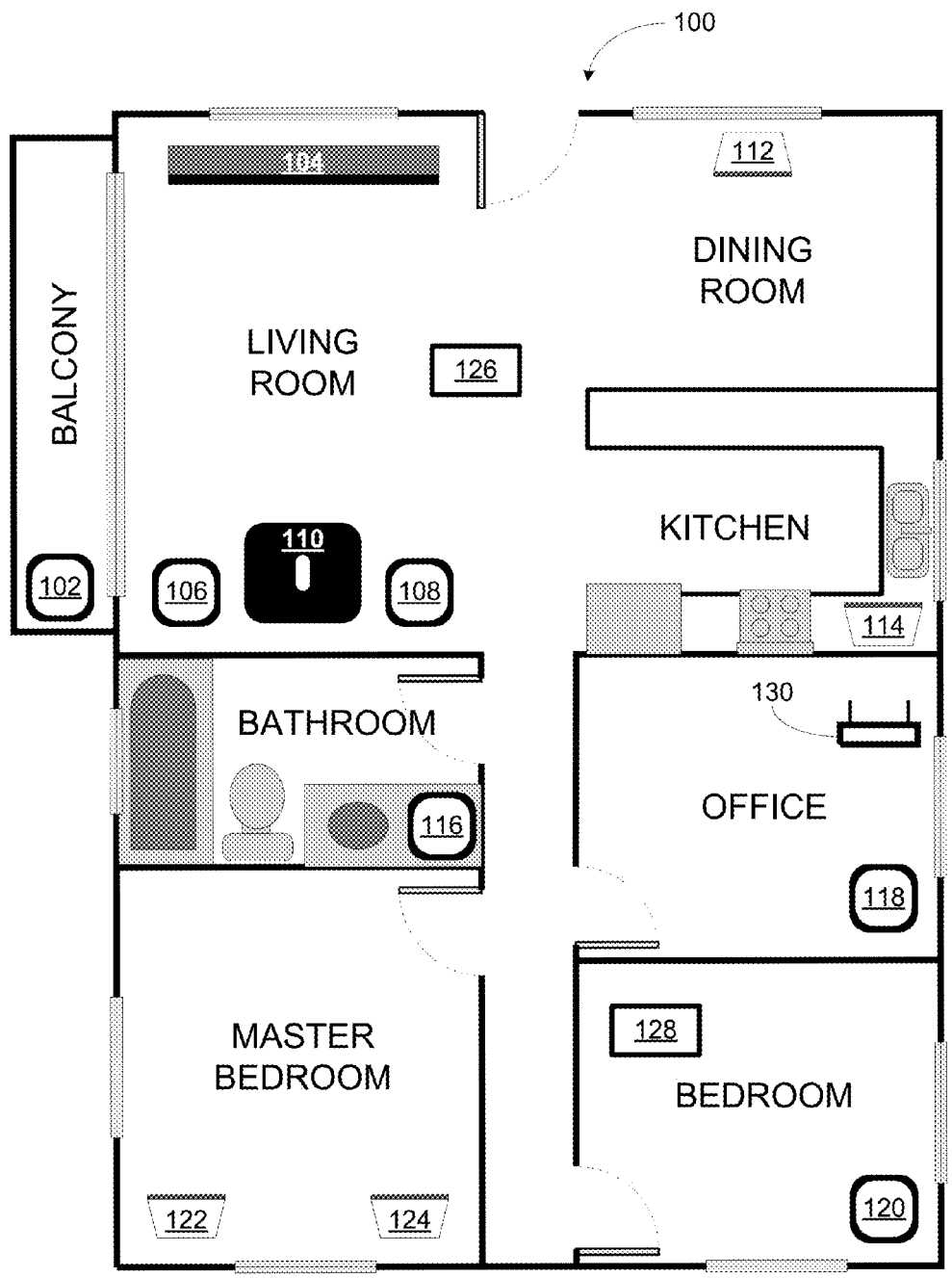
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein may involve, inter alia, play back of a cloud-based playback queue ("cloud queue"). In some embodiments, a computing system may maintain or have access to a cloud queue of media items. Such a computing system may be referred to a remote server, as one or more networks, such as a local area network and a wide area network (e.g., the Internet), may separate the computing system from entities, such as media playback systems, that might access the cloud queue. While such entities may access the cloud queue remotely (i.e., via one or more networks), they may play back media items of the cloud queue locally (e.g., on respective playback devices). Various techniques may facilitate play back of such a cloud queue.

Some examples techniques may involve management of a "playhead." A playhead may indicate, or "point to," a particular media item of the cloud queue and be referred to as a "playhead pointer." A playhead pointer may identify the currently playing media item of the cloud queue, or perhaps a media item that will be currently playing if playback of the cloud queue is initiated. Assigning a playhead pointer to a particular position of the queue may have various advantages. For instance, during playback of a cloud queue by a media playback system, a computing system may identify particular media items to indicate to the media playback system by reference to the playhead pointer. A playhead pointer may also facilitate multiple media playback systems playing back the cloud queue in synchrony.

Other example techniques may involve synchronization of the cloud queue with a media playback system (or multiple media playback systems). For instance, a media playback system might maintain or have access to a local queue that mirrors all or part of a cloud queue (e.g., by including one or more of the same media items that are indicated by the cloud queue, perhaps in the same order as the cloud queue). An example technique may involve maintaining synchronization between the local queue and the cloud queue, perhaps by re-synchronizing the local queue and the cloud queue periodically or upon the occurrence of a condition, such as a change of the currently playing media item.

In some embodiments, playback of a cloud queue may occur according to one or more playback policies. Such policies may be used to enforce restrictions on playback or display of media items of the cloud queue. For instance, a playback policy might restrict the use of certain transport controls, such as seeking forward or skipping backward. Alternatively, a playback policy might restrict modification of a pre-determined playback order of the queue. Playback policies may facilitate differentiation in how different media playback systems are permitted to playback a cloud queue. As an example, two or more media playback systems may be associated with respective policies that restrict respective aspects of playback of playback of a cloud queue. For instance, a first media playback system may be registered with a premium subscriber account and be associated with a first policy while a second media playback system is registered with a free account and associated with a second policy that restricts additional aspects of playback compared to the first policy.

As indicated above, example techniques may involve a "playhead." In one aspect, a method is provided. The method may involve receiving, from a media playback system, a request for an indication of a playhead pointer for a particular queue of media items. The method may also involve identifying a position of a playhead pointer within the particular queue of media items. Each position in the queue may correspond to a media item. The method may further involve sending, to the media playback system, an indication of the playhead pointer. The indication of the playhead pointer may indicate the assigned position of the playhead pointer.

In another aspect, a computing system is provided. The computing system includes a network interface, at least one processor, a data storage, and program logic stored in the data storage and executable by the at least one processor to perform functions. The functions may include receiving, from a media playback system, a request for an indication of a playhead pointer for a particular queue of media items. The functions may also include identifying a position of a playhead pointer within the particular queue of media items. Each position in the queue may correspond to a media item. The functions may further include sending, to the media playback system, an indication of the playhead pointer. The indication of the playhead pointer may indicate the assigned position of the playhead pointer.

In yet another aspect, a non-transitory computer readable memory is provided. The non-transitory computer readable memory has stored thereon instructions executable by a computing device to cause the computing device to perform functions. The functions may include receiving, from a media playback system, a request for an indication of a playhead pointer for a particular queue of media items. The functions may also include identifying a position of a playhead pointer within the particular queue of media items. Each position in the queue may correspond to a media item. The functions may further include sending, to the media playback system, an indication of the playhead pointer. The indication of the playhead pointer may indicate the assigned position of the playhead pointer.

In yet another aspect, another method is provided. The method may involve receiving, by a control device of a media playback system, input data that associates a zone of one or more playback devices with a particular queue of media items. The method may also involve sending, by the control device to a computing system, a request for an indication of a playhead pointer for the particular queue of media items. The method may further involve receiving, by the control device, the requested indication of the playhead pointer. The indication of the playhead pointer may indicate an assigned position of the playhead pointer in the particular queue of media items and assigned position may correspond to a media item at that position in the particular queue.

In another aspect, a device is provided. The device includes a network interface, at least one processor, a data storage, and program logic stored in the data storage and executable by the at least one processor to perform functions. The functions may include receiving, by a control device of a media playback system, input data that associates a zone of one or more playback devices with a particular queue of media items. The functions may also include sending, by the control device to a computing system, a request for an indication of a playhead pointer for the particular queue of media items. The functions may further include receiving, by the control device, the requested indication of the playhead pointer. The indication of the playhead pointer may indicate an assigned position of the playhead pointer in the particular queue of media items and assigned position may correspond to a media item at that position in the particular queue.

In yet another aspect, a non-transitory computer readable memory is provided. The non-transitory computer readable memory has stored thereon instructions executable by a computing device to cause the computing device to perform functions. The functions may include receiving, by a control device of a media playback system, input data that associates a zone of one or more playback devices with a particular queue of media items. The functions may also include sending, by the control device to a computing system, a request for an indication of a playhead pointer for the particular queue of media items. The functions may further include receiving, by the control device, the requested indication of the playhead pointer. The indication of the playhead pointer may indicate an assigned position of the playhead pointer in the particular queue of media items and assigned position may correspond to a media item at that position in the particular queue.

Also as indicated above, example techniques may involve synchronization of the cloud queue. In one aspect, a method is provided. The method may involve sending, to a remote server, (i) a request for an indication of at least one media item from a remote queue of media items, and (ii) an indication of a particular media item that is being played by the playback device. The method may also involve receiving an indication of one or more media items from the remote queue of media items. The one or more media items may include the particular media item is being played by the playback device. The method may further involve incorporating an indication of the one or more media items into a local queue of media items.

In another aspect, a device is provided. The device includes a network interface, at least one processor, a data storage, and program logic stored in the data storage and executable by the at least one processor to perform functions. The functions may include sending, to a remote server, (i) a request for an indication of at least one media item from a remote queue of media items, and (ii) an indication of a particular media item that is being played by the playback device. The functions may also include receiving an indication of one or more media items from the remote queue of media items. The one or more media items may include the particular media item is being played by the playback device. The functions may further include incorporating an indication of the one or more media items into a local queue of media items.

In yet another aspect, a non-transitory computer readable memory is provided. The non-transitory computer readable memory has stored thereon instructions executable by a computing device to cause the computing device to perform functions. The functions may include sending, to a remote server, (i) a request for an indication of at least one media item from a remote queue of media items, and (ii) an indication of a particular media item that is being played by the playback device. The functions may also include receiving an indication of one or more media items from the remote queue of media items. The one or more media items may include the particular media item is being played by the playback device. The functions may further include incorporating an indication of the one or more media items into a local queue of media items.

In yet another aspect, another method is provided. The method may involve receiving, from a media playback system, (i) a request for an indication of at least one media item from a remote queue of media items, and (ii) an indication of a particular media item that is being played by a playback device of the media playback system. The method may also involve determining one or more media items from the remote queue. The determined one or more items may include the particular media item. The method may further involve sending an indication of the determined one or more media items from the remote queue to the media playback system.

In another aspect, a device is provided. The device includes a network interface, at least one processor, a data storage, and program logic stored in the data storage and executable by the at least one processor to perform functions. The functions may include receiving, from a media playback system, (i) a request for an indication of at least one media item from a remote queue of media items, and (ii) an indication of a particular media item that is being played by a playback device of the media playback system. The functions may also include determining one or more media items from the remote queue. The determined one or more items may include the particular media item. The functions may further include sending an indication of the determined one or more media items from the remote queue to the media playback system.

In yet another aspect, a non-transitory computer readable memory is provided. The non-transitory computer readable memory has stored thereon instructions executable by a computing device to cause the computing device to perform functions. The functions may include receiving, from a media playback system, (i) a request for an indication of at least one media item from a remote queue of media items, and (ii) an indication of a particular media item that is being played by a playback device of the media playback system. The functions may also include determining one or more media items from the remote queue. The determined one or more items may include the particular media item. The functions may further include sending an indication of the determined one or more media items from the remote queue to the media playback system.

As further indicated above, example techniques may involve playback policies of a queue. In one aspect, a method is provided. The method may involve receiving, from a media playback system, at least one request for an indication of one or more media items from a queue of media items. The method may also involve identifying one or more playback policies that are associated with the queue of media items. Each of the one or more playback policies may restrict at least one aspect of playback of at least one of the one or more media items. The method may further involve sending, to the media playback system, an indication of the identified one or more playback policies.

In another aspect, a device is provided. The device includes a network interface, at least one processor, a data storage, and program logic stored in the data storage and executable by the at least one processor to perform functions. The functions may include receiving, from a media playback system, at least one request for an indication of one or more media items from a queue of media items. The functions may also include identifying one or more playback policies that are associated with the queue of media items. Each of the one or more playback policies may restrict at least one aspect of playback of at least one of the one or more media items. The functions may further include sending, to the media playback system, an indication of the identified one or more playback policies.

In yet another aspect, a non-transitory computer readable memory is provided. The non-transitory computer readable memory has stored thereon instructions executable by a computing device to cause the computing device to perform functions. The functions may include receiving, from a media playback system, at least one request for an indication of one or more media items from a queue of media items. The functions may also include identifying one or more playback policies that are associated with the queue of media items. Each of the one or more playback policies may restrict at least one aspect of playback of at least one of the one or more media items. The functions may further include sending, to the media playback system, an indication of the identified one or more playback policies.

In yet another aspect, another method is provided. The method may involve receiving input data indicating a request to playback a queue of media items. The method may also involve sending a request for an indication of one or more media items from the queue of media items. The method may further involve receiving (i) an indication of at least one media item from the queue; and (ii) an indication of one or more playback policies that are associated with the queue of media items. Each of the one or more playback policies may restrict at least one aspect of playback of the at least one media item from the queue. The method may additionally involve causing a graphical interface to display (i) a graphical indication of the at least one media item, and (ii) a graphical indication that at least one playback policy is associated with the at least one media item.

In another aspect, a device is provided. The device includes a network interface, at least one processor, a data storage, and program logic stored in the data storage and executable by the at least one processor to perform functions. The functions may include receiving input data indicating a request to playback a queue of media items. The functions may also include sending a request for an indication of one or more media items from the queue of media items. The functions may further include receiving (i) an indication of at least one media item from the queue; and (ii) an indication of one or more playback policies that are associated with the queue of media items. Each of the one or more playback policies may restrict at least one aspect of playback of the at least one media item from the queue. The functions may additionally include causing a graphical interface to display (i) a graphical indication of the at least one media item, and (ii) a graphical indication that at least one playback policy is associated with the at least one media item.

In yet another aspect, a non-transitory computer readable memory is provided. The non-transitory computer readable memory has stored thereon instructions executable by a computing device to cause the computing device to perform functions. The functions may include receiving input data indicating a request to playback a queue of media items. The functions may also include sending a request for an indication of one or more media items from the queue of media items. The functions may further include receiving (i) an indication of at least one media item from the queue; and (ii) an indication of one or more playback policies that are associated with the queue of media items. Each of the one or more playback policies may restrict at least one aspect of playback of the at least one media item from the queue. The functions may additionally include causing a graphical interface to display (i) a graphical indication of the at least one media item, and (ii) a graphical indication that at least one playback policy is associated with the at least one media item.

It will be understood by one of ordinary skill in the art that this disclosure includes numerous other embodiments. It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
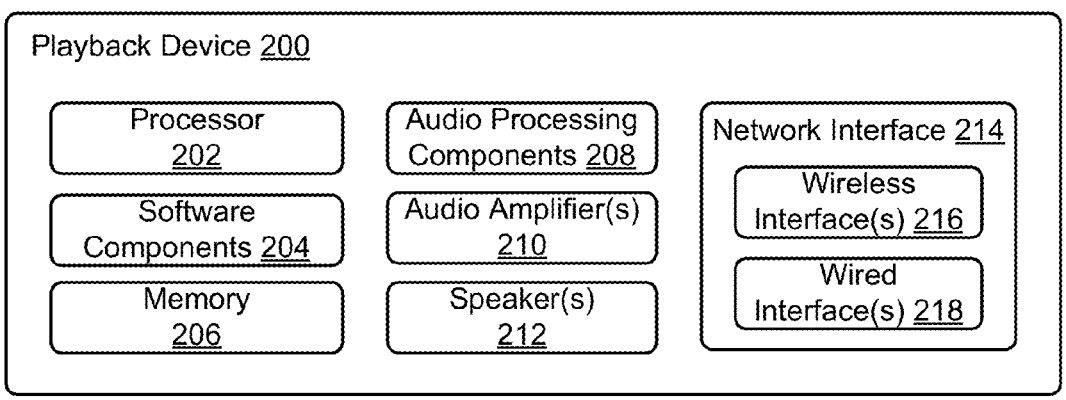
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
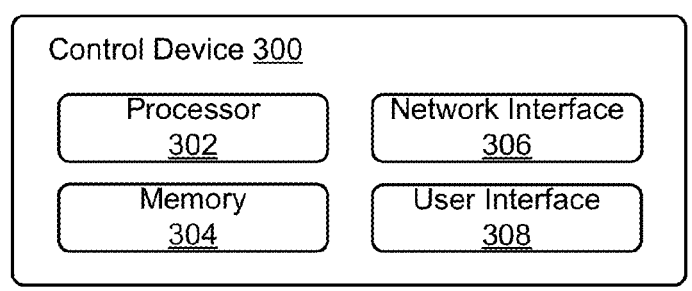
FIG. 3 shows a functional block diagram of an example control device.

FIG. 3 shows a functional block diagram of an example control device 300 that may be configured to be one or both of the control devices 126 and 128 of the media playback system 100. Control device 300 may also be referred to as a controller 300. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
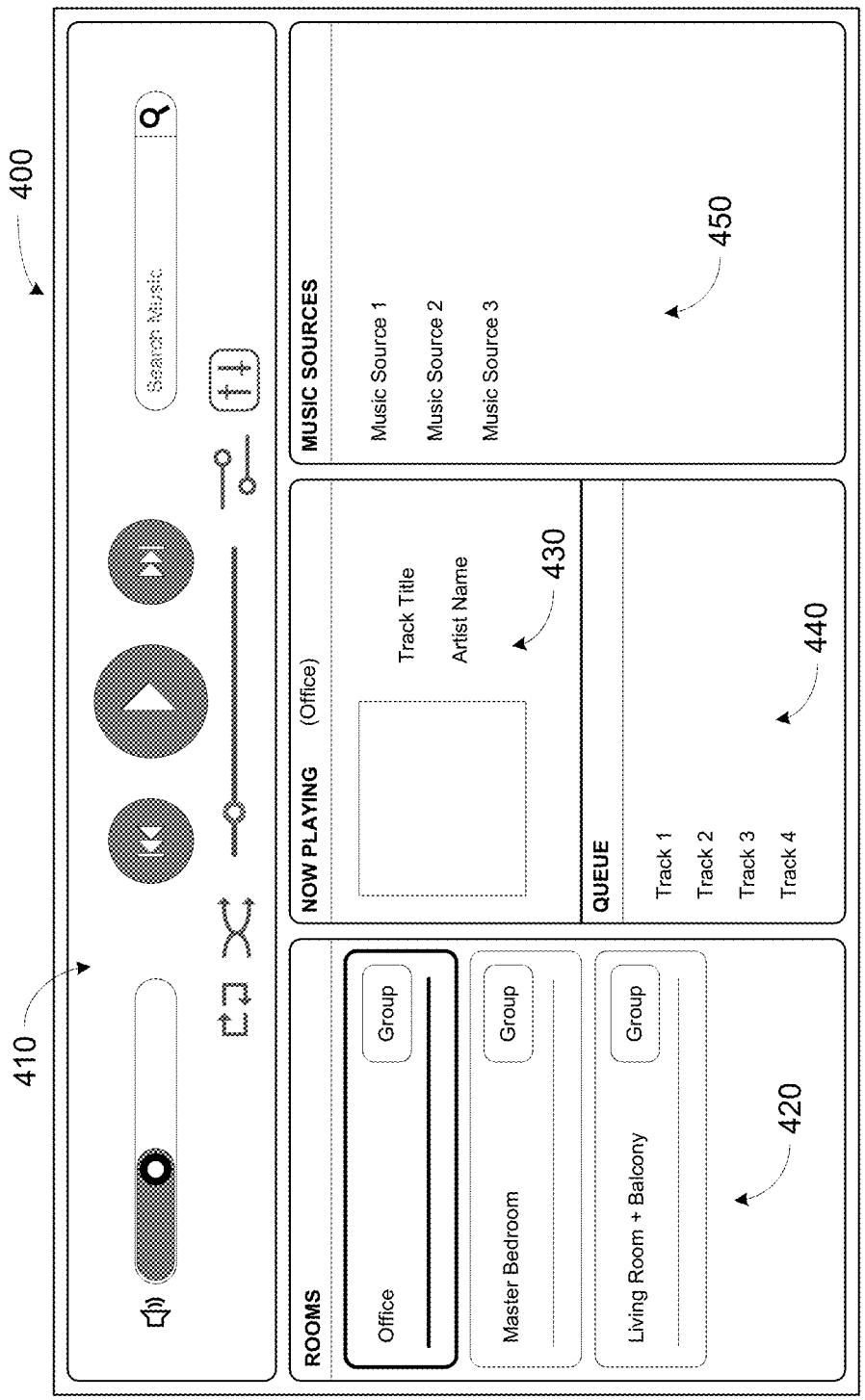
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Cloud Computing Functions

Various references are made herein to "cloud computing." The term "cloud computing" is used to refer to services delivered using distributed computing over a network, such as the Internet. A non-exhaustive list of services delivered via the cloud include electronic mail (e.g., GMAIL® or HOTMAIL®), social networking (e.g., FACEBOOK®, LINKEDIN®, or TWITTER®), file hosting (e.g., DROPBOX®), and streaming audio (e.g., SPOTIFY®, PANDORA®, or BEATSAUDIO®). Other cloud services are certainly offered as well.

Cloud service providers may offer one or more interfaces for accessing their service over a network. For instance, some cloud services may be accessed by visiting a web site using a web browser. Other cloud services are accessed by executing a particular application specific to the cloud service on a computing device. Some cloud services may offer an application programming interface (API) to facilitate access to the service by a third-party web site or application. Cloud services may provide multiple techniques for accessing their service. In many cases, a user who has access to a given cloud service can access the service from any computing device that is connected to the network, provided that the computing device has a supported interface to the cloud service.

In one instance, accessing a cloud service may involve accessing, with a first computing device (i.e., a client), a second computing device or system (i.e., a server). Example client devices may include playback device 200 of FIG. 2, or control device 300 of FIG. 3, among other possible devices. One or more programs or applications (i.e., instructions) may execute on the server to perform computing operations supported by the cloud service. The client may send various commands to the server to instruct the server to perform the computing tasks supported by the cloud service.

Figure 5:
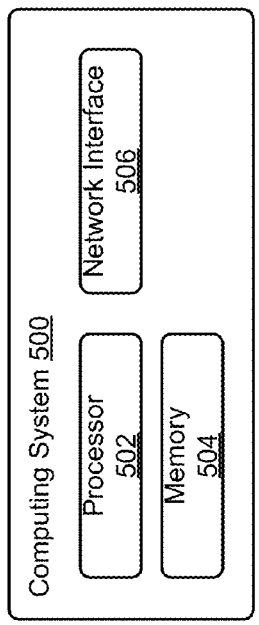
FIG. 5 shows an computing system that may practice certain embodiments.

FIG. 5 illustrates an example computing system 500 that may provide a cloud service to one or more users. Example computing system 500 includes at least one processor 502, memory 504, and a network interface 506. The memory 504 may contain instructions executable by the processor 502 to perform computing tasks supported by a cloud service. The computing device 500 may communicate with other computing devices via the network interface 506.

In aggregate, the provision of a cloud service many involve multiple instances of computing system 500. Each instance of computing system 500 may provide the cloud service to one or more users. Cloud service providers may scale the number of instances of computing system 500 involved in providing the cloud service based on user demand.

Data-based representations of "user accounts" may facilitate access to a cloud service. An individual user or a group of users may create a data-based "user account," which may also be referred to simply as an "account." An account for a particular user or user group may include data related to the particular user or user group, which the user or user group has opted to provide for association with the account. As such, the account of a particular user may, in a sense, be a data-based representation of that particular user.

A user may create an account for various applications, web sites, and/or online services, for instance. Examples of accounts include e-mail accounts, social network accounts, online financial accounts, service provider accounts, among other possibilities. Further, in some cases, a user may have a single account that provides a data-based representation of the user for multiple services, websites, applications, etc. For instance, a user might opt to use their e-mail account or social network account as a common login for various online services and applications, which might be provided by different entities. Such a data-based representation might be available to any of the instances of the computing systems involved in providing a service so that any of the instances may provide similar access to the service when a particular account is authenticated ("logged-in") with the service.

An account may also be used with devices and systems. For instance, a user of a device, such as a mobile phone, tablet computer, or laptop computer, may associate an account with the computing device itself, such that while the account is authenticated on the computing device, the account will be authenticated with applications that are provided on the computing device. The user might also associate an account with a media playback system, such that while the account is authenticated on the media playback system, the media playback system operates according to preferences of the account. Moreover, in some cases, a user's accounts for various services may be associated with one another. For instance, a user's account for a media playback system may be associated with the user's accounts for one or more streaming music services such that when a user's account for a media playback system is logged-in to the media playback system, the media playback system has access to the one or more streaming music services that are associated with the user's account for the media playback system.

Figure 6:
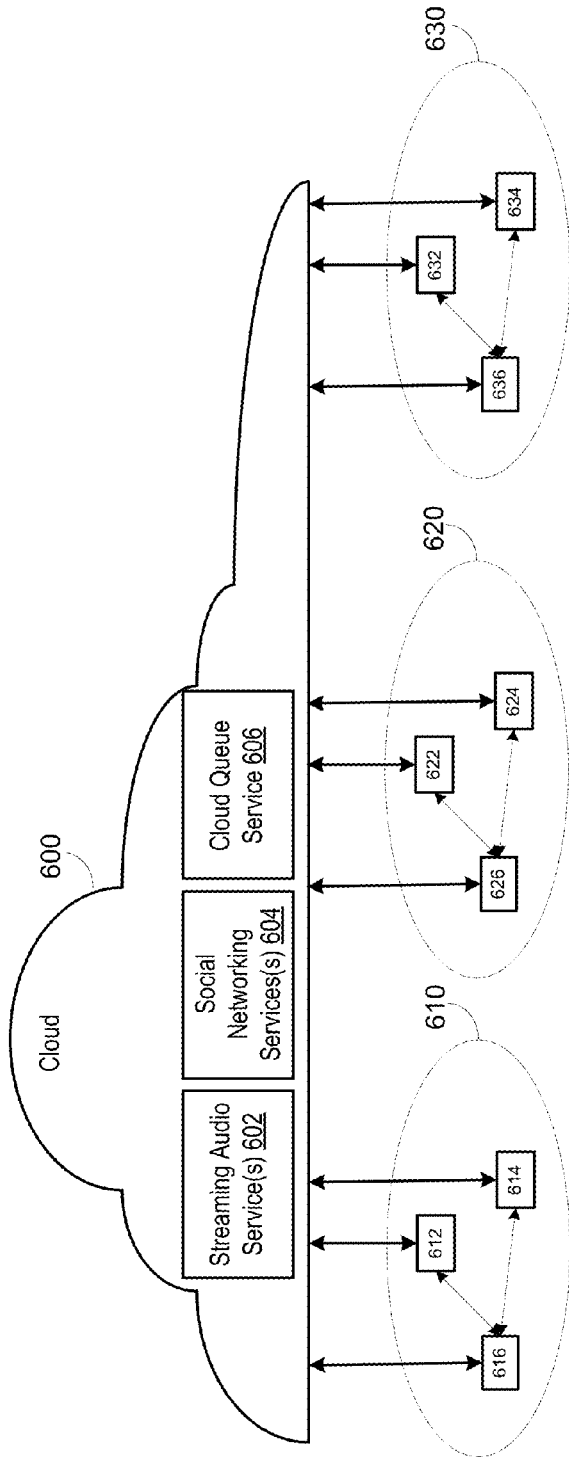
FIG. 6 shows an example cloud computing system in which certain embodiments may be practiced.

FIG. 6 illustrates an example cloud 600. The example cloud 600 may include any number of computing devices which are interconnected via one or more networks. For instance, cloud 600 may include one or more instances of computing system 500. As shown in FIG. 6, media playback systems 610, 620, and 630 are connected to cloud 600. Media playback system 610 includes playback devices 612 and 614 and control device 616, each having a respective connection to cloud 600. Likewise, media playback system 620 includes playback devices 622 and 624 and control device 626, also each having a respective connection to cloud 600. And media playback system 630 includes playback devices 632 and 634 and control device 636, also each having a respective connection to cloud 600.

Using the cloud 600, media playback systems 610, 620, and 630 may respectively access various cloud services. For instance, media playback systems 610, 620, and 630 may access one or more streaming audio services 602. As noted above, streaming audio services may provide audio content to media playback systems. Several example streaming audio services that are currently available include SPO-TIFY®, PANDORA®, BEATSAUDIO®, RDIO®, GOOGLE PLAY MUSIC ALL ACCESS®, SONY MUSIC UNLIMITED®, ITUNES RADIO®, XBOX MUSIC®, and TUNEIN RADIO®. Other streaming audio services certainly exist, and other streaming audio services may be offered in the future.

Media playback systems 610, 620, and 630 may also respectively access one or more social network services 604. Social network services are often characterized at least in part by various links between users of the service (or perhaps between accounts of the service). Such links are referred to by different names, such as "friends", "connections", "followers", or "favorites," among other examples. Users may create such links for various reasons. For instance, in some cases, the users may have a relationship outside of the social network (e.g., co-workers, relatives, or college friends). In other cases, two users may have similar interests (e.g., fans of a particular band or genre) or belong to a certain group and then form a link in the social network because they share these similar interests.

A cloud service provider may provide a cloud queue service 606. The cloud queue service 606 may maintain or have access to one or more playback queues (cloud queues). In some instances, the cloud queue service 606 may maintain playback queues for media playback systems registered with the cloud queue service 606. Such playback queues may be referred to as cloud queues. In other instances, the cloud queue service 606 may maintain multiple cloud queues for a particular media playback system, perhaps with one particular cloud queue "active" (i.e., "selected") at any instant. In further instances, the cloud queue service 606 may maintain a cloud queue that multiple media playback systems may access. One or more computing systems may be used to provide the cloud queue service 606 and to maintain the cloud queue(s) in data storage.

Accessing a cloud queue may involve any of a variety of operations with respect to the cloud queue. For instance, some devices may access the cloud queue to modify (e.g., add, remove, or re-order) media items in a playback queue maintained by cloud queue service 606. Such devices may include control devices, such as control device 300, or any suitable device having a network interface to communicate with the cloud queue service 606. As another example, a media playback system, such as media playback systems 610 and 620, may access the cloud queue to play back the cloud queue.

Devices of a media playback system may provide control inputs that cause a media playback system to access the queue. For instance, a control device of a media playback system (e.g., control device 300) may provide an interface (e.g., controller interface 400) that includes various controls. The control device may detect input at such controls and responsively perform operations with respect to the cloud queue. Alternatively, a playback device of a media playback system may include various controls (e.g., buttons) that are operable to generate input data that requests various operations with respect to a cloud queue.

A cloud queue may have various advantages. For example, a cloud queue that is maintained (e.g., hosted) on a computing system (e.g., a server) may be accessible by multiple media playback systems, which might be physically located in different households. This type of accessibility may permit various joint ("social") functions. As one example, the multiple media playback systems may play back the cloud queue in synchrony, such that respective users of the multiple media playback systems may experience a social listening session. As another example, a cloud queue may provide greater flexibility in where and how the queue is modified (e.g., media items added, removed, or re-ordered) as some embodiments may have the functionality to enable devices to request modifications to the cloud queue via a network. For instance, a user might make modifications to a cloud queue using a smartphone while on the go, and, at a later time, listen to that cloud queue while in the presence of the user's media playback system. A cloud queue may facilitate greater flexibility in where the queue is played back (e.g., a cloud queue may be played back on both home and work media playback systems). Streaming audio services (e.g., streaming audio services 602) may facilitate a cloud queue, as media playback systems in different physical locations may each have access to the same media items through one or more streaming audio services.

Access to a cloud queue may be controlled or restricted using various techniques. Some example techniques may involve controlling access to a cloud queue based on the identity of the entity that is accessing the cloud queue. Other example techniques may involve controlling access to a cloud queue based on a configuration or settings of the cloud queue itself.

FIG. 7 shows example playback queue 700. Playback queue 700 includes a list of entries 702-732. Entries 702-732 contain Songs A-P in positions 1-16, respectively, by having respective metadata for each song associated with each entry. The metadata may also include an indication, such as a uniform resource identifier (URI), which indicates where each song is stored. For instance, for a particular song, the metadata may include a uniform resource locator (URL) indicating where that particular song can be retrieved from a streaming audio service, such as streaming audio service 602 depicted in FIG. 6. Songs A-P may represent any of the example audio items noted above. Although playback queue 700 is shown by way of example as including 15 entries, playback queue 700 may gain additional entries or have fewer entries if media items are added (i.e., inserted) or removed (i.e., deleted) from playback queue 700, respectively. Media playback systems may play back the queue 700, perhaps in a certain order, such as sequential playback by position or random (shuffle) playback.

Playback queue 700 may be maintained for one or more media playback systems by a cloud queue service, such as cloud queue service 606, and be referred to as a "cloud queue." For example, an instance of computing system 500 of FIG. 5 (which may provide cloud queue service 606) may maintain playback queue 700 for media playback system 610. In such an example, playback device 612 and/or playback device 616 may maintain a local copy of playback queue 700, perhaps in a memory, such as memory 206 of FIG. 2. Alternately, playback queue 700 may be maintained on another computing system, such as an instance of control device 300 of FIG. 3. Such a local copy may provide a cached instance of a cloud queue, such that devices of the media playback system may access the local copy and avoid transmission delays that may be involved in accessing the cloud queue, among other possible benefits.

The above discussions relating to playback devices, controller devices, playback zone configurations, media content sources, and cloud computing provide only some examples of operating environments within which functions and methods described below may be implemented. Other operating environments and configurations of media playback systems, playback devices, and network devices not explicitly described herein may also be applicable and suitable for implementation of the functions and methods.

Methods 800, 1000, 1200, 1400, 1500, and 1700 shown in FIGS. 8, 10, 12, 14, 15, and 17, respectively, present embodiments of methods that can be implemented within an operating environment including, for example, the media playback system 100 of FIG. 1, one or more of the playback device 200 of FIG. 2, one or more of the control device 300 of FIG. 3, or one or more of the computing system 500 of FIG. 5. Further, operations illustrated by way of example as being performed by a media playback system can be performed by any suitable device, such as a playback device or a control device of a media playback system. Methods 800, 1000, 1200, 1400, 1500, and 1700 may include one or more operations, functions, or actions as illustrated by one or more of blocks shown in FIGS. 8, 10, 12, 14, 15, and 17, respectively. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods and other processes disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the methods and other processes disclosed herein, each block may represent circuitry that is wired to perform the specific logical functions in the process.

III. Example Techniques to Facilitate Playback Using a Playhead

As discussed above, embodiments described herein may involve a playhead pointer that indicates a particular media item of a cloud queue. The playhead pointer may facilitate playback of the queue by identifying a currently playing media item (or a media item that a media playback system is preparing to play) to the remote server and/or to media playback systems that are accessing the queue.

In some examples, a playback pointer may facilitate play back of a cloud queue by mitigating some effects of latency. Unlike local playback of a local queue by a media playback system, local playback of a cloud queue by a media playback system may involve the additional operations of communicating with a remote server that maintains or has access to the cloud queue. Because a remote server that maintains a cloud queue and media playback systems that might play back the cloud queue are separated by one or more networks, significant latency may exist between the remote server and each media playback system. This latency may allow the remote system to become "out of sync" with one or more of the media playback systems. For instance, a remote server and a media playback system may identify different media items within the queue as the currently playing media item. Use of a playback pointer may mitigate such issues and may have other advantages as well.

Figure 8:
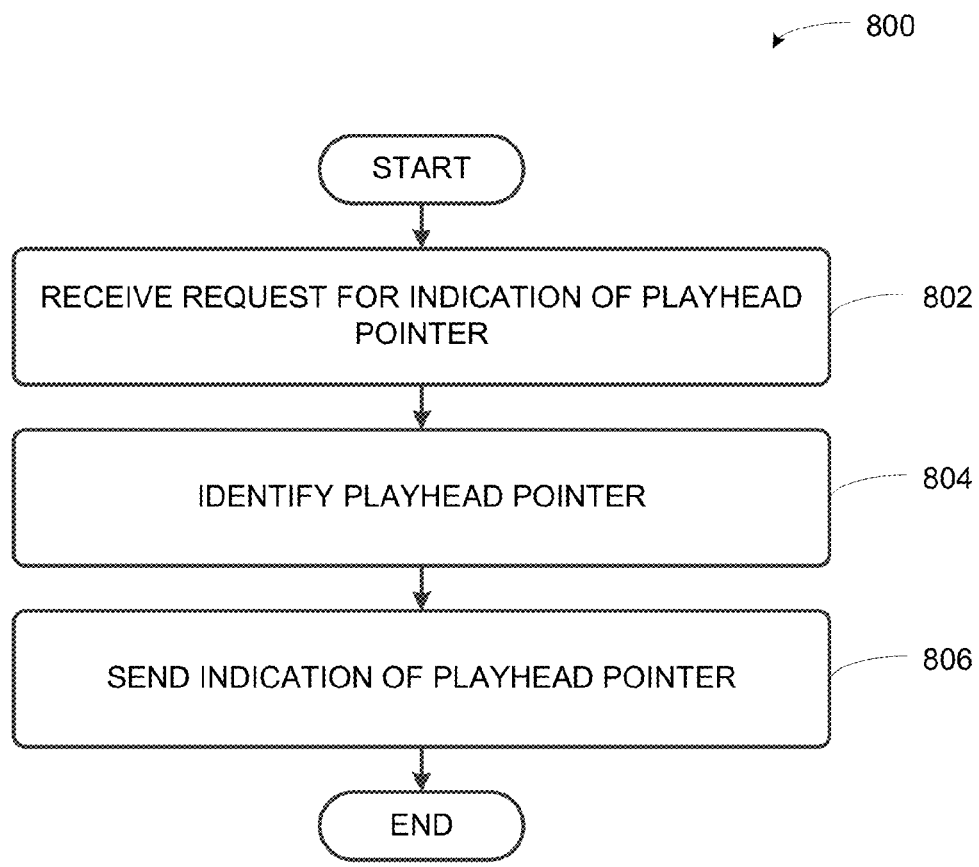
FIG. 8 is an example flow diagram to facilitate playback using a playhead pointer.

FIG. 8 illustrates an example method 800 to facilitate playback using a playhead pointer. Within examples, a computing system (e.g., a server) may maintain a playhead pointer for a queue.

a. Receive Request for Indication of Playhead Pointer

At block 802 of method 800, the method involves receiving a request for an indication of a playhead pointer. For instance, a computing system, such as computing system 500 of FIG. 5, may receive a request for an indication of a playhead pointer for a particular queue of media items that the computing system maintains or has access to. The queue may be a cloud queue, such as an instance of playback queue 700 of FIG. 7.

As indicated above, a playhead pointer may be assigned to a position within a queue of media items. Each position in the queue may correspond to a media item, such that by assigning a playhead pointer to a particular position of the queue, the playhead pointer indicates a particular media item at that position within the queue. In operation, the playhead pointer may identify a currently playing media item of the cloud queue, or perhaps a media item that will be currently playing if playback of the cloud queue is initiated.

A media playback system may send a request for an indication of a playhead pointer as an aspect of performing certain operations. As noted above, a media playback system may access a queue. Such access may include playback of the queue, display of the queue, or manipulation of the queue, among other examples. Some of these operations may involve a playhead pointer for the queue, as the playhead pointer may identify a particular media item having relevance to the operation. For instance, as noted above, a playhead pointer may identify a currently playing media item of the cloud queue, or perhaps a media item that will be playing if playback of the cloud queue is initiated. Accordingly, in carrying out certain operations, a media playback system may send a request for an indication of a playhead pointer. After requesting (and thereafter receiving) the requested indication, the media playback system might use the received indication of the playhead pointer to proceed in carrying out those operations.

In some embodiments, a media playback system may send a request for an indication of a playhead pointer to a computing system that maintains or has access to the queue. For instance, a playback device (e.g., playback device 200 of FIG. 2) or a control device (e.g., control device 300 of FIG. 3) of a media playback system may send a request to a computing system that assists in providing a cloud service by maintaining a cloud queue of media items. The media playback system and the computing system may be separated by one or more networks (e.g., one or more local networks and one or more wide area networks, such as the Internet) such that the computing system is remote from the media playback system. For instance, devices of a media playback system might be situated in a home or workplace and a computing system maintaining a cloud queue might be situated in a data center. One or more networks may communicatively couple the respective systems.

Figure 9A:
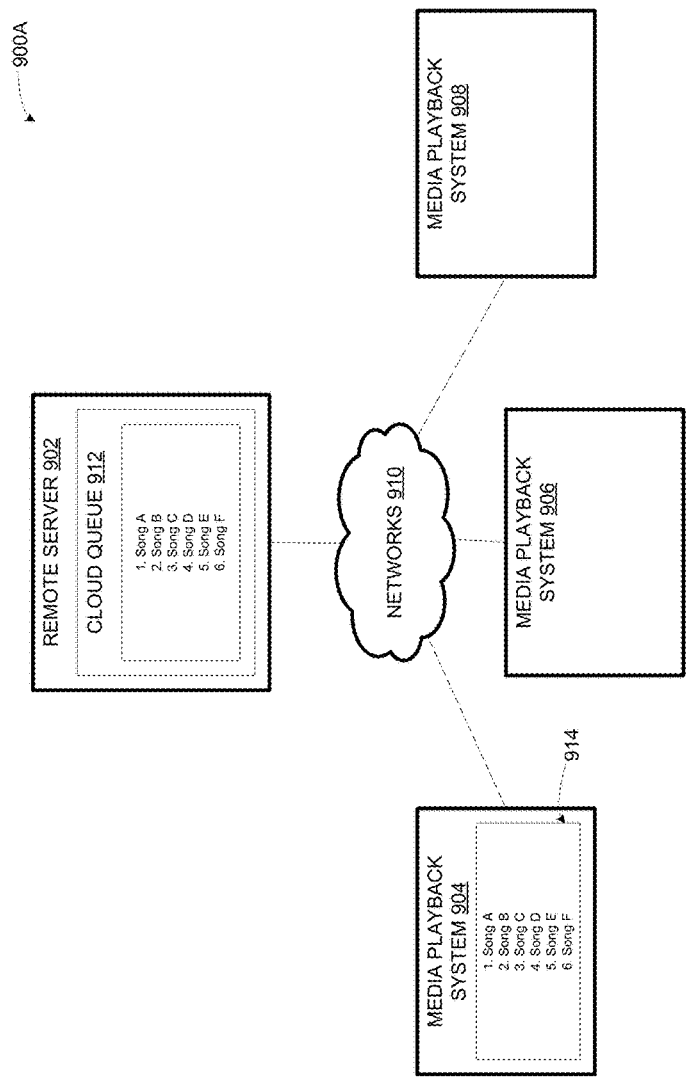
FIG. 9A shows a first instance of an example environment in which certain embodiments may be practiced.

FIG. 9A illustrates an example environment 900A that includes a remote server 902 that maintains a cloud queue 912. Cloud queue 912 represents an example queue of media items that can be maintained by a cloud service. Cloud queue 912 may be an instance of playback queue 700 of FIG. 7, perhaps including a different sequence of media items. Cloud Queue 912 includes a sequence of media items, including, in order, representative media items Song A, Song B, Song C, Song D, Song E, and Song F.

As shown in FIG. 9A, remote server 902 is connected to media playback system 904, media playback system 906, and media playback system 908 by one or more networks 910, which may include one or more wide area networks, such as the Internet, as well as one or more local area networks (e.g., a 802.11 wireless local area network or 802.3 wired local area network, or combination thereof). In operation, one or more of media playback system 904, media playback system 906, and media playback system 908 may connect to remote server 902 to access cloud queue 912. As noted above, such access might include playback, display, or modification of cloud queue 912, among other examples.

In some embodiments, a media playback system, such as media playback system 904, may be associated with cloud queue 912. Such association may result in cloud queue 912 being available for media playback system 904 to access (e.g., playback). In some examples, media playback system 904 may have requested remote server 902 to generate cloud queue 912, and be associated with cloud queue 912 by virtue of having requested that cloud queue 912 be generated. In other examples, another media playback system (e.g., media playback system 906 or 908) may have created cloud queue 912 and media playback system 904 may become associated with cloud queue 912 through one of various association procedures. For instance, media playback system 904 may receive an invite to access cloud queue 912 (perhaps from media playback system 906 via remote server 902).

As another example, media playback systems may be associated with respective user accounts. Such user accounts may in turn be associated with respective user accounts of a social network (e.g., a user account of a media playback system that represents a given user may be associated with a user account of a social networking service that also represents the given user). Given that connections between such accounts are created within the social network (e.g., the accounts are "friended"), media playback system 904 may optionally connect to cloud queues created by media playback systems that are associated with such connected accounts. Other example association procedures are possible as well.

As noted above, a media playback system may send a request for an indication of a playhead pointer as an aspect of performing certain operations. In some embodiments, a media playback system may send such a request as an aspect of playback. For example, media playback system 904 may prepare to play back cloud queue 912, perhaps on one or more playback devices of media playback system 904. In some embodiments, preparing to play a queue may involve setting a particular queue as an active queue for at least one playback device. For instance, a group of playback devices (e.g., a "zone") may have access to multiple queues, with any one queue being active at any instance. As an example, media playback system 904 may set cloud queue 912 as its active queue, perhaps upon receiving input data requesting such a configuration. Within examples, preparing to play a queue might involve additional or alternative operations.

Within examples, preparing to play back cloud queue 912 may involve receiving input data indicating a request to initiate playback of cloud queue 912. Such input data may cause the media playback system to perform further operations related to playback of a cloud queue (e.g., sending a request for an indication of a playhead for the cloud queue). In some cases, a control device may receive such input data upon selection of a "Play" transport control in a playback control region (e.g., playback control region 410 of FIG. 4). Alternatively, a control device may receive input data indicating a selection of a media item of cloud queue 912. Such input might be received in a playback queue region (e.g., playback queue region 440 of FIG. 4).

As noted above, a device of a media playback system (e.g., a control device) may maintain a local queue that provides a cached instance of a cloud queue. Local queue 914 is an example of such a queue. In operation, a device of media playback system 904 may display an indication of local queue 914, perhaps in a playback queue region, and by such display also show a representation of the cloud queue that is mirrored by the local queue. The device may receive input that is directed to the cloud queue (e.g., input data indicating a request to play back the cloud queue beginning with a particular media item) but which is relative to the displayed local queue (e.g., a selection of the particular media item within the displayed local queue). Such an arrangement may reduce the amount of perceived latency in some circumstances, as operations may be performed with respect to the local queue. Such operations may be propagated to the cloud queue.

As noted above, in some embodiments, operations involved in playback of a particular queue may lead to a media playback system sending a request for an indication of a playhead pointer for the particular queue. For example, a control device or a playback device of media playback system 904 may send such a request using a network interface over one or more networks 910 to remote server 902. Remote server 902 may receive the request using a respective network interface.

Within examples, the media playback system may also send to the computing system an indication of the media item that the media playback system is to play back. For example, as noted above, media playback system 904 may receive input data indicating a particular media item of the cloud queue to play back. Media playback system 904 may send, to remote server 902, a media item identifier (e.g. a URI) that indicates the particular media item. Remote server 902 may receive such an identifier, which may influence where the playhead pointer is assigned within cloud queue 912. For instance, the computing system may assign the playhead pointer to the position within the queue that corresponds to the media item identified by the received media item identifier. Within examples, such an identifier could be sent with the request for an indication of a playback pointer or in a separate message to a computing system.

In other cases, a particular media item to play back might not be indicated in such a message. For instance, the computing system may receive a request to playback the particular queue at the beginning of the particular queue (i.e., at the first media item). As an example, media playback system 904 may have received input data corresponding to manipulation of a play transport control, which might correspond to a default media item within the queue (e.g., the media item that is ordered first in the queue or perhaps the media item that was last played back) and send a request to play back cloud queue 912 beginning at that media item.

b. Identify a Playhead Pointer

At block 804 of FIG. 8, the method involves identifying a playhead pointer. For instance, a computing system may identify a position within a queue of media items to which a playhead pointer has been assigned. Each position in the queue may correspond to a media item, such that the assigned playhead pointer indicates a particular media item at that position within the queue. Alternatively, a computing system may assign a playhead pointer to a position with a queue of media items. The computing system may identify the playhead pointer upon receiving the request for an indication of a playhead pointer for the queue.

Figure 9B:
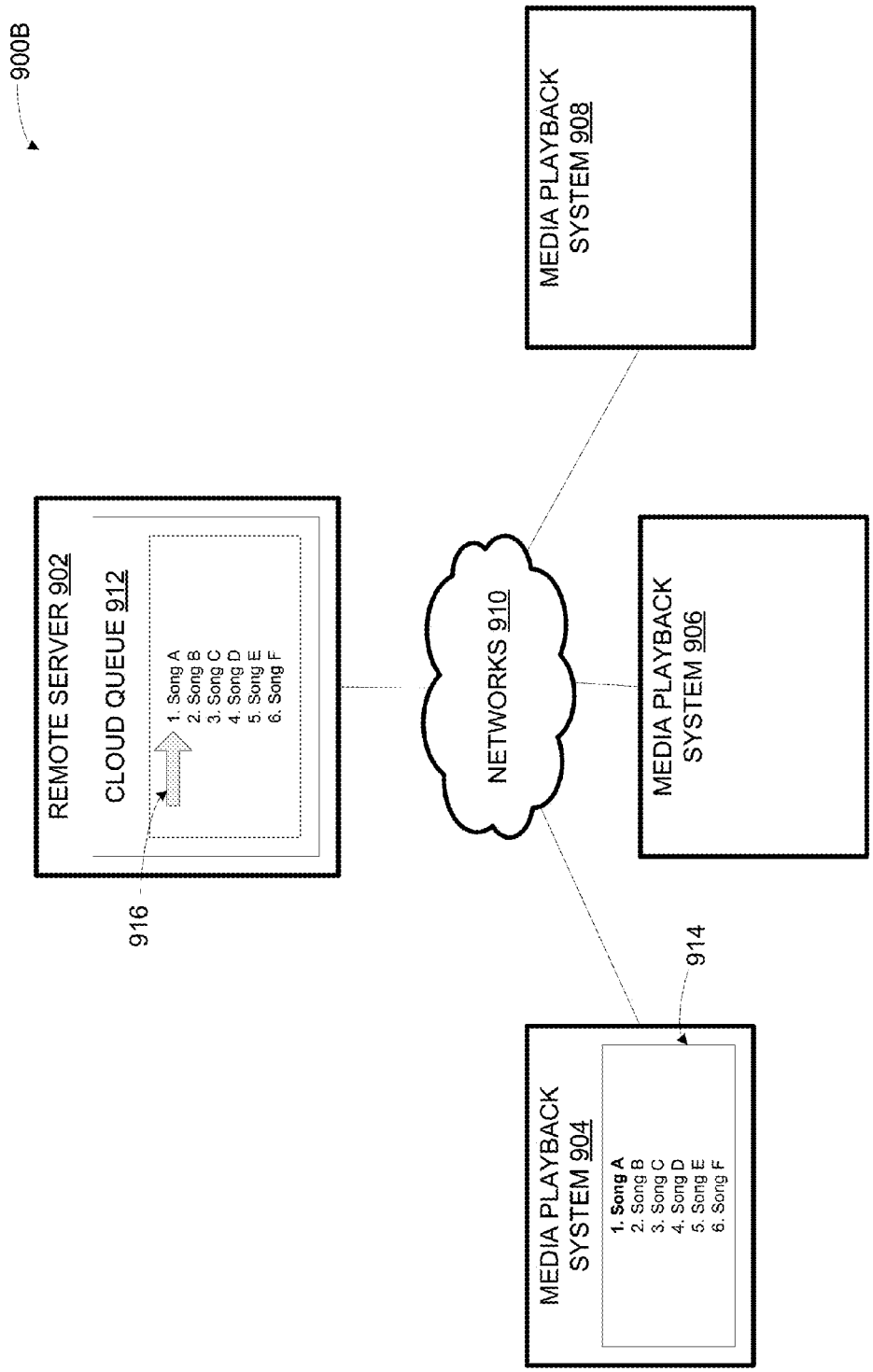
FIG. 9B shows a second instance of the example environment in which certain embodiments may be practiced.

FIG. 9B shows an example environment 900B. As noted above in reference to FIG. 9A, remote server 902 may maintain cloud queue 912 and receive a request from media playback system 904 (or another media playback system) for an indication of a playhead pointer for cloud queue 912. As shown in FIG. 9B, the computing system may identify a position of playhead pointer 916 within playback cloud queue 912. For purposes of illustration, playhead pointer 916 is depicted in FIG. 9B as a graphical arrow icon that points to a particular position ('1') with playback queue 700. By assigning playhead pointer 916 to position '1', playhead pointer may indicate the media item of position 1. As shown, position '1' of playback queue 700 corresponds to Song A.

Each position in a queue may correspond to a different URI. Accordingly, in some embodiments, the playhead pointer may be associated with a URI corresponding to the position. The URI may include a string of characters that identifies the position indicated by the playhead pointer. Remote entities, such as a media playback system, may access the position to which the playhead pointer is assigned using particular protocols, such as the Hypertext Transfer Protocol (HTTP) or the File Transfer Protocol (FTP). A portion of the URI may indicate an operation to access or obtain the media item at the position by way of a protocol.

As indicated above, in some cases, a playhead pointer might not yet be assigned to a particular position. In such cases, identifying the playhead pointer may involve assigning a playhead pointer to a position within a queue of media items, perhaps upon determining that a playhead pointer is not yet assigned or upon receiving a request to assign the playhead pointer to a different position. For instance, the computing system may assign playhead pointer 916 to a position within cloud queue 912 (e.g., position '1'). Further, in further cases, a playhead pointer might not have been created. In such cases, the computing system may generate a playhead pointer configured to indicate a position in the particular queue, and possibly assign the generated playhead pointer to a position within the queue.

In other cases, a playhead pointer might have already been assigned to a position within the queue, perhaps based on an earlier request for an indication of a playhead pointer for the queue. In such cases, identifying the playhead pointer might involve determining the assigned position of the playhead pointer, perhaps by querying a data storage in which the playhead pointer is maintained.

In some cases, the computing system may receive a media item identifier that indicates a particular media item that a media playback system is to play back (perhaps with the request for the indication of a playhead pointer or in a separate message). A media playback system may send such a media item identifier to the computing system based on receiving input data indicating the particular media item (e.g., input data indicating a request to play the particular media item of the cloud queue). After receiving such a media item identifier, the computing system may assign the playhead pointer to the position within the queue that corresponds to that media item. For instance, media playback system 904 may receive a media item identifier that indicates Song B and assign the playhead pointer to the position in cloud queue 912 that corresponds to Song B (position '2'). In such cases, the media playback system may assign the playback pointer to a particular position in the queue corresponding to the particular media item (e.g., to position '2').

In other cases, the computing system might not receive an indication of a particular media item that the media playback system is to play back, perhaps because the media playback system is preparing to play a default item. For example, as noted above, the remote server 902 may receive a request to playback cloud queue 912 at the beginning of the particular queue or, alternatively at some other default position, such as the position of the media item of cloud queue 912 that was last played. In such cases, the media playback system may assign the playback pointer to a particular position in the queue which corresponds to that media item.

As noted above, in some cases, the computing system may receive a request to assign the playhead pointer to a different position. A media playback system may send such a request to the computing system under certain conditions. For instance, the media playback system may receive input data requesting an operation that involves a change in the assigned position of the playhead (e.g., input data indicating a transport control to change the currently playing media item). As another example, a media item might finish playback at a media playback system, and the media playback system may send an indication of this to the computing system.

In some embodiments, a media playback system may maintain a local playhead pointer. As noted above, a media playback system may maintain a local queue that represents a cloud queue (perhaps by mirroring all or part of the cloud queue). A media playback system may assign a local playhead pointer to a particular position in the local queue. In some instances, the media playback system may send an indication of the position of the local playhead pointer within the local queue. For example, the media playback system may change the assigned position of the local playhead pointer, perhaps based on input data (e.g., a transport control to change the currently playing media item) or upon the media item finishing playback. After receiving an indication of the position of the local playhead pointer within the local queue, a computing system may determine whether the particular position of the local playhead pointer in the local queue is different from the assigned position of the playhead pointer (within a cloud queue). Given that the respective positions of the local playhead pointer and the playhead pointer of the cloud queue are different, the computing system may re-assign the playhead pointer to a position with the cloud queue corresponding to the position of the local playhead pointer within the local queue. In such a manner, the playheads of the local queue and the cloud queue might be synchronized.

c. Send Indication of Playhead Pointer

At block 806 of FIG. 8, the method involves sending an indication of the playhead pointer. For instance, a computing system may send an indication of the assigned playhead pointer. The indication of the playhead pointer may indicate the assigned position of the playhead pointer, so as to indicate a particular media item at that position within the queue. Referring back to FIG. 9B, remote server 902 may send, by way of a network interface, an indication of playhead pointer 916 to media playback system 904 over one or more networks.

In some cases, sending the indication of the playhead pointer may involve sending data indicating a uniform resource identifier. As noted above, a URI may indicate the assigned position of the playhead pointer in a queue of media items. For instance, remote server 902 may send a URI indicating position '1' to media playback system 904.

As noted above, media playback system 904 may use the indication of the playhead pointer in carrying out certain operations. For instance, after receiving an indication of the playhead pointer, a media playback system may initiate playback of the queue at the assigned position of the playhead pointer. In some examples, sending the indication of the playhead pointer may cause the media playback system to initiate playback of the queue at the assigned position of the playhead pointer, as receiving such a message may instruct the media playback system to initiate playback of the queue at the assigned position of the playhead pointer. As noted above, in some cases, a media playback system may include a zone of one or more playback devices. For instance, media playback system 904 may include two playback devices that are grouped together into a zone (which may be associated with cloud queue 912 as the active queue of the zone). In such an instance, the indication of the playhead pointer may cause the playback devices of the zone to initiate playback of the media item in synchrony.

In some implementations, a device (e.g., a playback device) on which a local queue is stored or maintained may control the positioning of the queue. Under such an arrangement, requests to manipulate the assigned position of a playhead pointer may go through the device and then propagate to the computing system on which the corresponding cloud queue is stored or maintained. In some cases, latency between devices requesting manipulation of the playhead and the device maintaining the playhead may create the potential for race conditions. By first manipulating the assigned position of a playhead of a local queue and then propagating the new position to the cloud queue, such issues may be avoided.

As an example of such an arrangement in operation, a computing system (e.g., remote server 902) may receive an indication of a command to manipulate the assigned position of the playhead pointer. Such an indication may be received from a control device (e.g., a control device of media playback system 904). The control device may send such a request based on receiving input data indicating a request to change a currently playing (or currently paused) song (which may be the media item to which the playhead pointer is assigned). As noted above, in operation, a control device may provide a user interface (e.g., user interface 400 of FIG. 4) that includes controls (e.g., transport controls) for changing such a media item. Based on such a request, remote server 902 may send, to the media playback system 904, an indication of the command to manipulate the assigned position of the playhead pointer. Media playback system 904 may manipulate the position of the playhead pointer on local queue 914 and send an indication of a new position (after the requested manipulation) of the playhead pointer to remote server 902. Remote server 902 may receive the indication of the new position of the playhead pointer, and re-assign playhead pointer 916 to the new position within cloud queue 912. Remote server 902 may then send to the control device an indication that the position of the playhead pointer has been re-assigned.

Within examples, a computing system may assign a status to entities that request access to a cloud queue. A given status may authorize the entity to which the status is assigned to perform certain operations with respect to a playhead pointer. Different statuses may be assigned to different entities. Each status may authorize the entity to perform a different set of operations with respect to the playhead pointer such that each status provides a particular level of access to the playhead pointer. For example, referring back to FIG. 9B, remote server 902 may assign a first status to media playback system 904 and a second status to media playback system 906. The first status and the second status may authorize media playback system 904 and media playback 906 to perform a first set of operations and a second set of operations respectively. Remote server 902 might also assign a status to media playback system 906 (e.g., the first or second statuses, or perhaps a third status that authorizes an entity to perform a third set of operations).

As one example, a computing system may assign an "owner" status and a "subscriber" status to respective entities (e.g., media playback system 904 and media playback system 906). An owner status may authorize entities (e.g., media playback system 904 (or a particular device or group of devices thereof)) to perform a first set of operations. The first set of operations may include operations that correspond to manipulation of the playhead pointer (e.g., operations to create a playhead pointer for a queue or change its assigned position within the queue). The subscriber status may authorize entities (e.g., media playback system 906 (or a particular device or group of devices thereof)) to perform a second set of operations that is different from the first set of operations. The second set of operations may include operations that correspond to "read" access. The "read" access operations may include operations in which the position that the playhead indicator is assigned is read (e.g., identifying the assigned position of the playhead pointer), but might exclude operations that involve manipulation of the playhead pointer. Read access may include operations involved in a playback device playing back a cloud queue in synchrony with a playhead pointer. In some cases, the first set of operations might be inclusive of the second set of operations, and be referred to as "full" access.

In some cases, the computing system may limit the number of entities having the owner status to a threshold number of entities. For example, a playhead pointer may have a single owner but multiple subscribers. In some cases, different devices within a media playback system may have different statuses. For instance, a control device might have read access while a playback device has full access. As noted above, a playback device on which a local queue is stored or maintained may control the position of the playhead pointer. Other arrangements are possible as well.

Further, as noted above, different media playback systems might have different statuses. Such an arrangement may facilitate various joint listening experiences among the different media playback systems. For instance, referring back to FIG. 9B, remote server 902 may assign an owner status to media playback system 904 that permits full access to playhead pointer 916. Such a status may permit media playback system 904 to manipulate the position of playhead pointer 916, perhaps by sending a request for such manipulation over one or more networks 910. Remote server 902 may assign a subscriber status to media playback systems 906 and 908 that permits read access to playhead pointer 916. Such a status may permit media playback systems 906 and 908 to playback cloud queue 912 in synchrony with playhead pointer 916 (e.g., to playback the media item at the position to which playhead pointer 916 is assigned). Under this arrangement, playback system 902 may function as a "DJ" and media playback systems 906 and 908 may function as listeners to the playback order determined by the DJ.

IV. Second Example Techniques to Facilitate Playback Using a Playhead

As discussed above, embodiments described herein may involve a playhead pointer that indicates a particular media item of a cloud queue. The playhead pointer may facilitate playback of the queue by identifying a currently playing media item (or a media item that a media playback system is preparing to play) to the remote server and/or to media playback systems that are accessing the queue.

Figure 10:
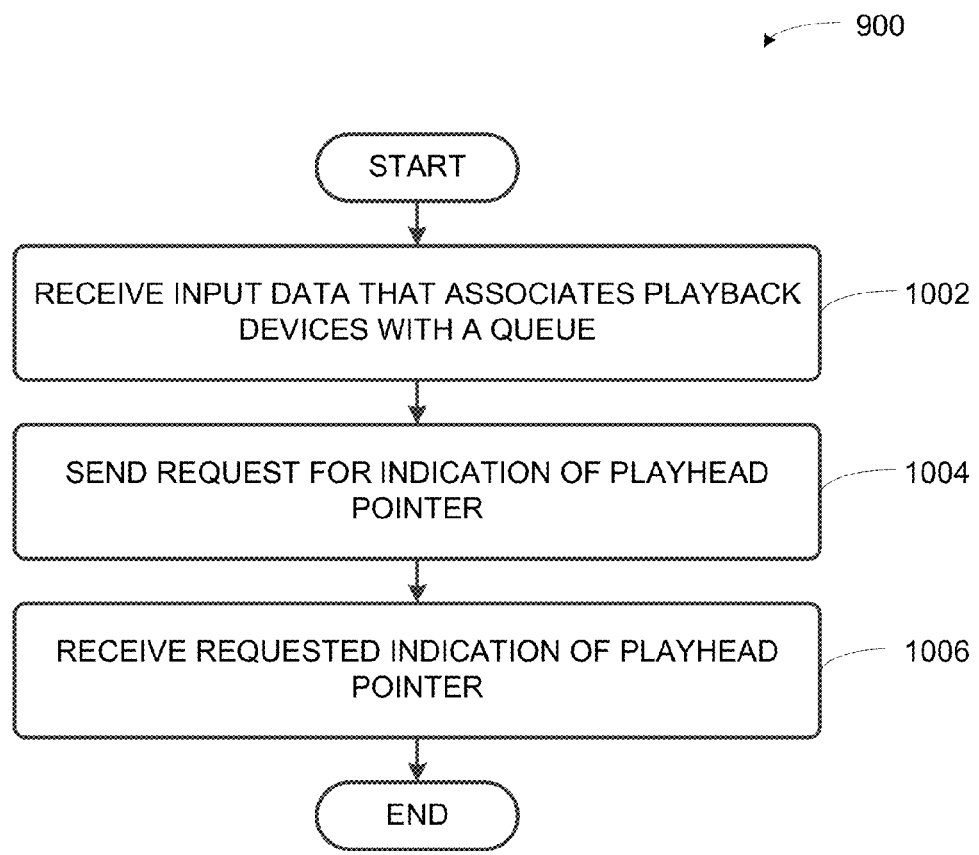
FIG. 10 is another example flow diagram to facilitate playback using a playhead pointer.

FIG. 10 illustrates an example method 1000 to facilitate playback using a playhead pointer. Within examples, a device of a media playback system (e.g., a control device or a playback device) may perform operations involving a playhead pointer to facilitate playback.

a. Receive Input Data that Associates Playback Devices with a Queue

At block 1002 of FIG. 10, the method involves receiving input data that associates one or more playback device with a queue. For instance, a device, such as control device 300 of FIG. 3, may receive input data that associates a zone (e.g., a group) of one or more playback devices with a particular queue of media items. The queue may be a cloud queue, such as playback queue 700 of FIG. 7. The device may receive such input data by way of a user interface (e.g., user interface 308). The user interface may include a controller interface, such as controller interface 400 of FIG. 4, which may include various regions having controls and/or information.

Within examples, a particular media playback system may maintain or have access to a queue or plurality of queues. This plurality may include local queues (i.e., queues that are maintained by a device of the media playback system) and/or cloud queues (i.e., queues that are maintained by a system which is separated from the media playback system by at least one wide area network (e.g., the Internet). As noted above, in some instances, a local queue may mirror a cloud queue, or a portion of the cloud queue, so as to provide an instance of the cloud queue that is local to the media playback system (e.g., within a common local area network). A controller interface of a media playback system may display an indication of the queues that the media playback system maintains or has access to.

A media playback system may create (and maintain) local queues or gain access to queues maintained by remote entities (e.g., remote servers and/or remote media playback systems). In some embodiments, the media playback system may receive an indication of one or more queues maintained by a remote entity. A control device of the media playback system may display an indication of the one or more queues maintained by the remote entity (and perhaps also one or more local queues maintained within the media playback system). Such an indication may be displayed in a controller interface, such as controller interface 400 of FIG. 4.

As noted above, a particular media playback may be divided into one or more zones that include one or more respective playback devices. Within examples, playback devices of a zone may be configured to playback media items in synchrony, either by playing the same content in synchrony or by playing in synchrony portions of the same content (e.g., stereo channels).

In operation, input data received by a device of a media playback system may lead to the media playback system (or the device thereof) associating a zone of one or more playback devices with a particular queue of media items (e.g., any one of a plurality of queues that the media playback system maintains or has access to). By way of such an association, the particular queue that is associated with a zone may be considered the "active" queue for that zone. Playback of the active queue may involve playback of the media items of the queue on the one or more playback devices of the zone. Within examples, a media playback system may associate any zone of the media playback system with any queue that the media playback system maintains or has access to. For instance, referring back to FIG. 1, media playback system 100 may associate the Living Room zone (including playback devices 104, 106, 108, and 110) with a particular queue (e.g., queue 700 of FIG. 7). Playback of the particular queue may then involve playback of the media items of queue 700 on playback devices 104, 106, 108, and 110.

For instance, referring back to FIG. 9B, media playback system 904 may include at least one zone of playback devices (e.g., one or more instances of playback device 200) that are configured to play audio in synchrony. A control device of media playback system 904 may receive input data that associates cloud queue 912 with a particular zone of media playback system 904, such that cloud queue 912 is the active queue of the zone.

Within examples, receiving input data that associates a zone of one or more playback devices with a particular queue of media items may cause the media playback system to perform one or more operations to facilitate playback of the queue. Such operations may involve a playhead pointer.

b. Send Request for an Indication of a Playhead Pointer

At block 1004, the method involves sending a request for an indication of a playhead pointer. For instance, the device of the media playback system (e.g., the control device) may send to a computing system, such as computing system 500 of FIG. 5, a request for an indication of a playhead pointer for a particular queue of media items that the computing system maintains or has access to (e.g., a cloud queue).

As indicated above, a playhead pointer may be assigned to a position within a queue of media items. Each position in the queue may correspond to a media item, such that by assigning a playhead pointer to a particular position of the queue, the playhead pointer indicates a particular media item at that position within the queue. In operation, the playhead pointer may identify a currently playing media item of the cloud queue, or perhaps a media item that will be currently playing if playback of the cloud queue is initiated.

As further indicated above, a media playback system may send a request for an indication of a playhead pointer as an aspect of performing certain operations. As noted above, a media playback system may access a queue. Such access may include playback of the queue, display of the queue, or manipulation of the queue, among other examples. Some of these operations may involve a playhead pointer for the queue, as the playhead pointer may identify a particular media item having relevance to the operation. For instance, after a zone of a media playback system is associated with a cloud queue, a device of the media playback system may send a request for an indication of a playhead pointer. As noted above, a playhead pointer may identify a currently playing media item of the cloud queue, or perhaps a media item that is configured to begin playing on the playback devices of the zone if playback of the cloud queue is initiated.

In some embodiments, a media playback system may send a request for an indication of a playhead pointer to a computing system that maintains or has access to the queue. For instance, a playback device (e.g., playback device 200 of FIG. 2) or a control device (e.g., control device 300 of FIG. 3) of a media playback system may send a request to a computing system that assists in providing a cloud service by maintaining a cloud queue of media items. The media playback system and the computing system may be separated by one or more networks (e.g., one or more local networks and one or more wide area networks, such as the Internet) such that the computing system is remote from the media playback system. For instance, devices of a media playback system might be situated in a home or workplace and a computing system maintaining a cloud queue might be situated in a data center. One or more networks may communicatively couple the respective systems.

For instance, referring back to FIG. 9B, a particular zone of media playback system 904 may be associated with cloud queue 912, such that cloud queue 912 is the active queue of the zone. After such an association, a device of media playback system 904 (e.g., a control device) may send to remote server 902 a request for an indication of a playhead pointer for cloud queue 912. As indicated above, after receiving such a request, remote server 902 may identify a position within cloud queue 912 to which the playhead pointer of cloud queue 912 is assigned. In some cases, remote server 902 may create the playhead pointer and/or assign the playhead pointer to a position. For instance, as noted above, remote server 902 may assign playhead pointer 916 to position '1' within cloud queue 912.

In some embodiments, media playback system 904 may also send a zone identifier to remote server 902, perhaps with the request for an indication of a playhead pointer. The zone identifier may indicate to remote server 902 which particular zone of media playback system 904 is requesting the indication of the playhead pointer. In some embodiments, the zone identifier may include a playback device identifier that indicates a particular playback device of the zone. This particular playback device may maintain a local queue (e.g., local queue 914).

c. Receive Requested Indication of Playhead Pointer

At block 1006, the method involves receiving the requested indication of the playhead pointer. For instance, continuing the example above, a device of media playback system 904 may receive an indication of playhead pointer 916. As noted above, the received indication of playhead pointer 916 may indicate the assigned position of the playhead pointer in cloud queue 912.

As noted above, after receiving a requested indication of a playhead pointer, a media playback system may use such a playhead pointer in carrying out certain operations. For instance, the control device may cause a graphical interface to display an indication of the assigned position of the playhead so as to identify visually the position of the queue to which the playhead pointer is assigned. In some cases, the control device may cause the graphical interface to display an indication of a media item that corresponds to an assigned position of a playhead in the queue of media items.

Figure 11:
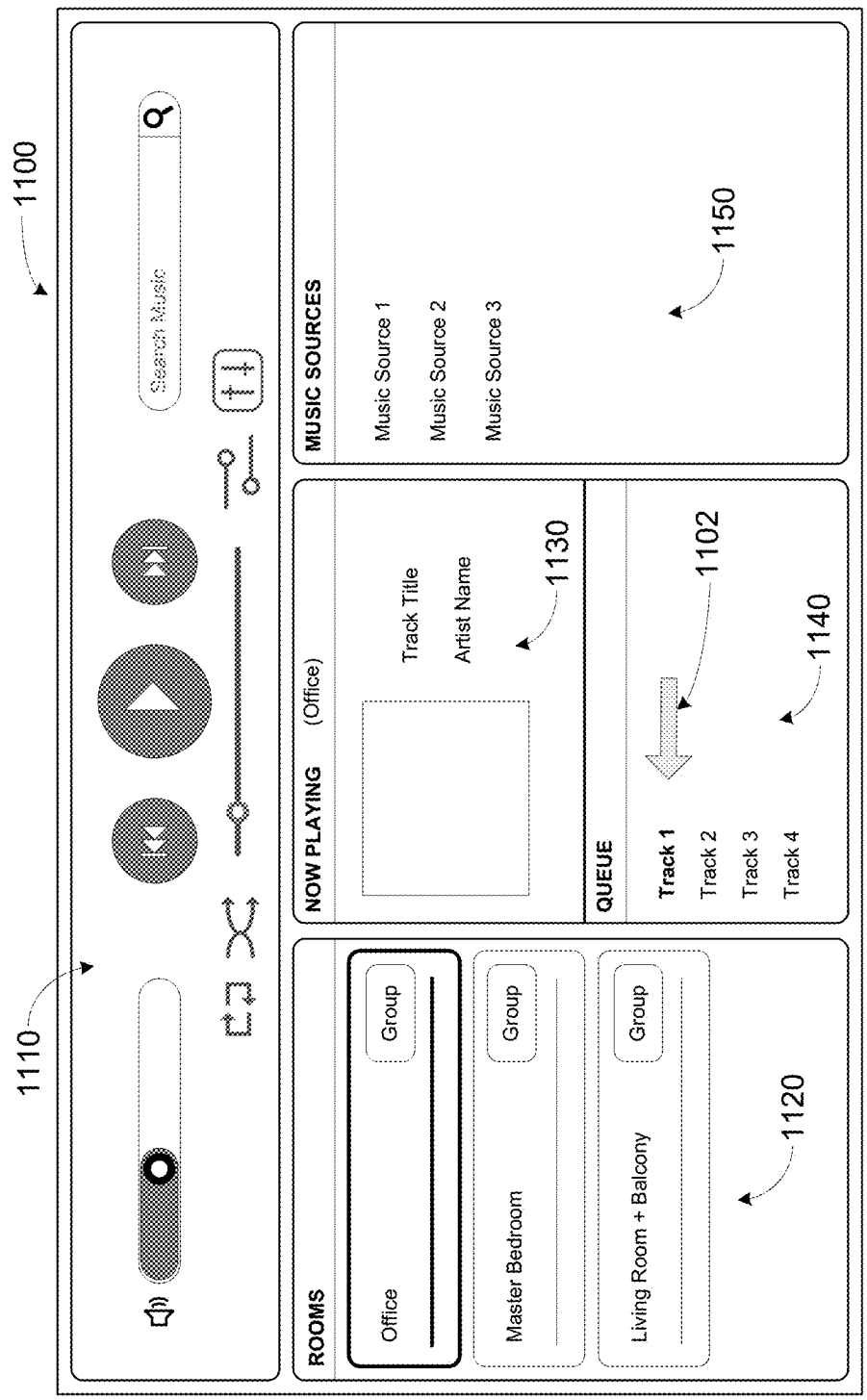
FIG. 11 shows an example controller interface that includes an indication of a playhead pointer.

FIG. 11 shows a controller interface 1100. As shown, controller interface 1100 includes a playback control region 1110, a playback zone region 1120, a playback status region 1130, a playback queue region 1140, and an audio content sources region 1150, which may correspond, respectively, to the playback control region 410, the playback zone region 420, the playback status region 430, the playback queue region 440, and the audio content sources region 450 of controller interface 400 shown in FIG. 4.

Controller interface 1100 of FIG. 11 also includes an arrow 1102 that indicates a media item that corresponds to the assigned position of a playhead pointer in a queue of media items. In addition, the title of the media item indicated by the playhead pointer is indicated in bold text. While such indications are shown by way of example, other implementations may display an indication of the assigned position of the playhead using different techniques.

The media playback system may also use such a playhead pointer in carrying out other operations. For instance, the control device may send an indication of the assigned position of the playhead pointer to a playback device of the zone. The playback device may initiate playback of the media item that is located at the assigned position of the playhead pointer, perhaps in synchrony with other playback devices of the zone.

In some embodiments, the playback device may maintain a local queue (e.g., local queue 914 of FIG. 9B) that mirrors a cloud queue (e.g., cloud queue 912), or a portion of a cloud queue. The playback device may determine whether the assigned position of the playhead position is consistent with an assigned position of a local playhead pointer of local queue 914. If the positions are inconsistent, media playback system 904 may update the position of the local playhead pointer or update the position of playhead pointer 916 by sending an indication of the position of the local playhead pointer to remote server 902.

In some cases, a control device of a media playback system may receive input data indicating a command to manipulate the position of the playhead pointer. As noted above, a controller interface may include controls that facilitate manipulation of the assigned position of a playhead pointer (perhaps to manipulate the currently playing media item). For instance, the controller interface may include a playback control region (e.g., playback control region 410) having transport controls (e.g., skip forward or skip backward) and/or a playback queue region 440 (by which individual media items may be selected). In response to receiving such input data, the control device may send an indication of the command (or perhaps the new position of the playhead pointer) to a playback device of the zone. The playback device may update the assigned position of a local playhead pointer within a local queue (e.g., within local queue 914). The playback device may also send an indication of the command (or perhaps the new position of the playhead pointer) to the remote server that is maintaining the cloud queue. Alternatively, the control device may send the indication of the command to the remote server.

In other cases, another media playback system may manipulate the assigned position of the playhead pointer within a cloud queue. For instance, a control device of media playback system 906 may send a request to remote server 902 to manipulate the assigned position of playhead pointer 916 within cloud queue 912. Remote server 902 may then send an indication of the newly assigned position to media playback system 904. For instance, a control device of media playback system 904 may receive one or more respective messages indicating respective positions of the playhead in the queue of media items (perhaps each time the position of the playhead pointer is changed). Upon receiving each message, the control device may cause a graphical interface to display an indication of the respective position of the playhead indicated by the message, so as to indicate the currently playing media item (or perhaps the media item that will play back if playback is initiated).

V. Example Techniques to Synchronize Queues

Figure 12:
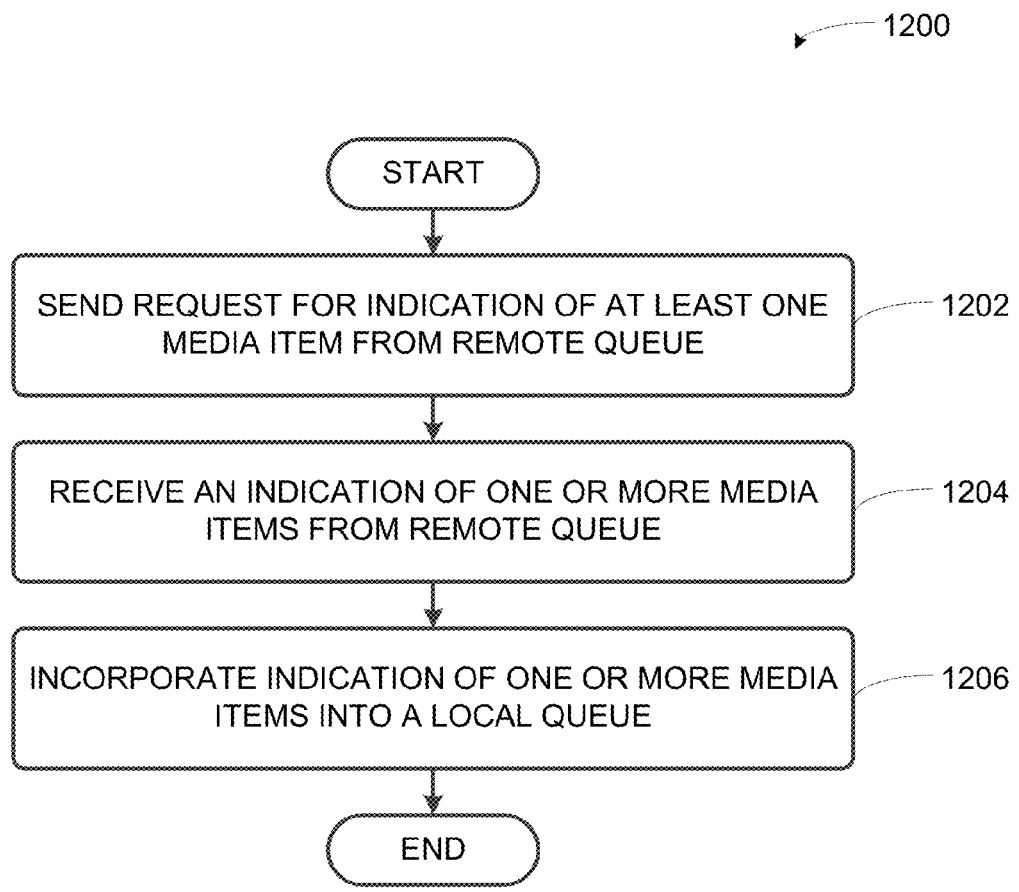
FIG. 12 is an example flow diagram to synchronize a local queue with a cloud queue.

As noted above, embodiments described herein may involve synchronizing a first queue (e.g., a cloud queue) and one or more second queues (e.g., local queues). FIG. 12 illustrates an example method to synchronize a local queue with a cloud queue.

a. Send Request for Indication of at Least One Media Item from Queue

At block 1202 of method 1200, the method involves sending a request for an indication of at least one media item from a queue of media items. For instance, a device (e.g., a playback device, such as playback device 200 of FIG. 2)

may send, to a remote server, a request for an indication of at least one media item from a remote queue of media items that the remote server maintains or has access to. The device and the remote server may be separated by one or more networks, such as one or more local area networks and/or one or more wide area networks (e.g., the Internet), and the request may be sent by way of a network interface of the device. In some embodiments, the remote server may be involved in providing a cloud service and the remote queue may be referred to as a cloud queue.

Figure 13A:
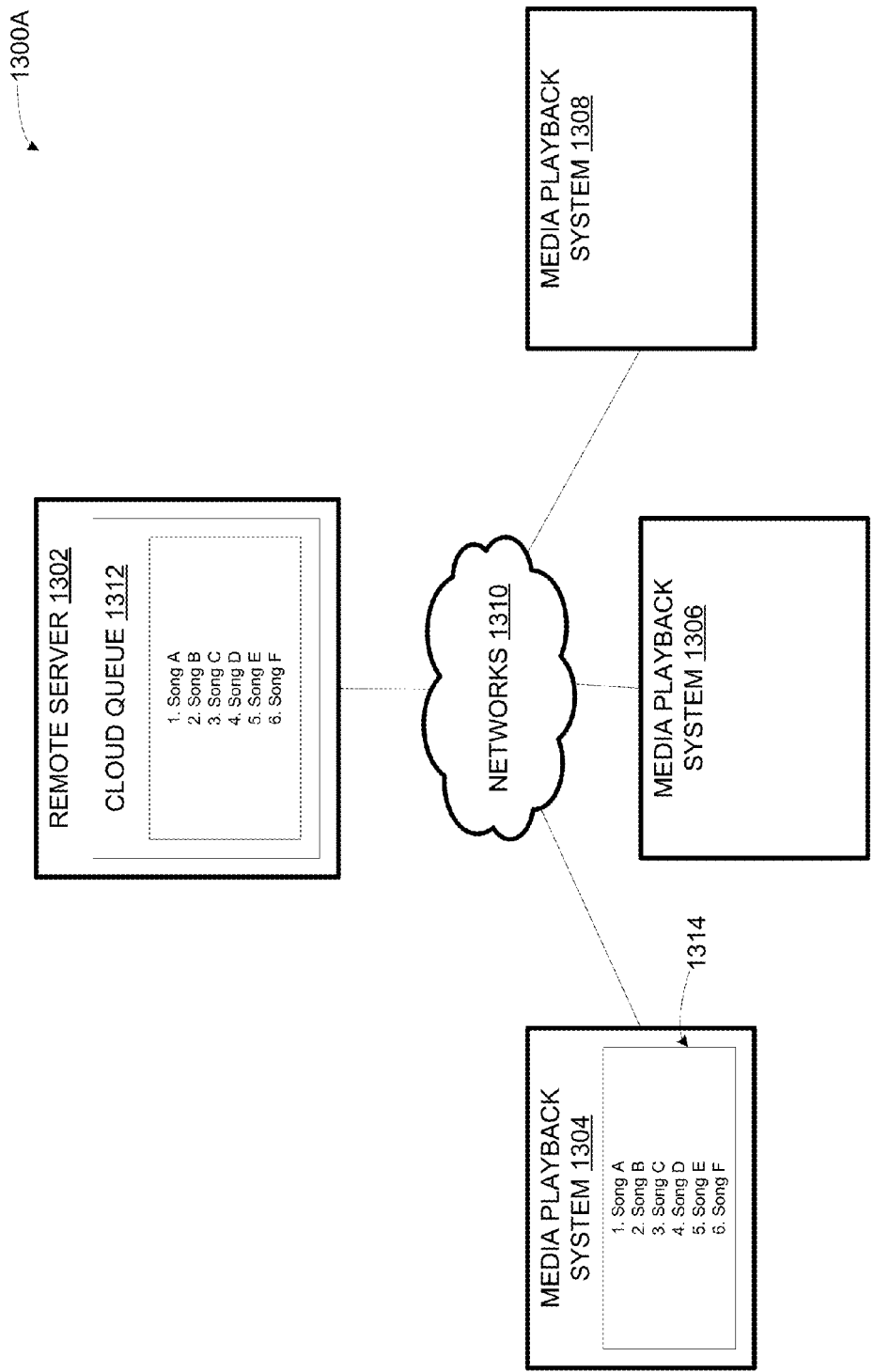
FIG. 13A shows a first instance of a second example environment in which certain embodiments may be practiced.

FIG. 13A illustrates an example environment 1300A that includes a remote server 1302 which maintains a cloud queue 1312. Cloud queue 1312 represents an example queue of media items that can be maintained by a cloud service. Cloud queue 1312 may be an instance of playback queue 700 of FIG. 7, perhaps including a different sequence of media items. Cloud Queue 1312 includes a sequence of media items, including, in order, representative media items Song A, Song B, Song C, Song D, Song E, and Song F.

As shown in FIG. 13A, remote server 1302 is connected to media playback system 1304, media playback system 1306, and media playback system 1308 by one or more networks 1310, which may include one or more wide area networks, such as the Internet, as well as one or more local area networks (e.g., a 802.11 wireless local area network or 802.3 wired local area network, or combination thereof). In operation, one or more of media playback system 1304, media playback system 1306, and media playback system 1308 may connect to remote server 1302 to access cloud queue 1312. As noted above, such access might include playback, display, or modification of cloud queue 1312, among other examples.

As noted above, in some embodiments, a media playback system may be associated with a cloud queue such that the cloud queue becomes available for the media playback system to access. For instance, media playback system 1304 may be associated with cloud queue 1312 such that cloud queue 1312 is available for media playback system 1304 to access, perhaps for playback or modification. To facilitate such access, media playback system 1304 may initially synchronize a local queue (e.g., local queue 1314) with cloud queue 1312. Such synchronization may involve remote server 1302 sending an indication of one or more media items of cloud queue 1312 to media playback system 1304. Media playback system may incorporate those media items into the local queue that is to be synchronized with cloud queue 1312 (e.g., local queue 1314). For instance, local queue 1314 is shown by way of example as including, in sequence, Songs A-F from cloud queue 1312.

In operation, a media playback system may perform one or more operations to keep a local queue of the media playback system in synchrony with a cloud queue, as the queues may become out of sync when modifications are made to either the local queue or the cloud queue. For instance, a device of media playback system 1304 may perform operations to keep local queue 1314 of media playback system 1304 in synchrony with cloud queue 1312. These operations may involve media playback system 1304 sending, to remote server 1302 via the one or more networks 1310, a request for an indication of at least one media item from cloud queue 1312. Such a request may facilitate synchronizing cloud queue 1312 with local queue 1314, as remote server 1312 may respond to the request with an indication of certain media items from cloud queue 1312.

Figure 13B:
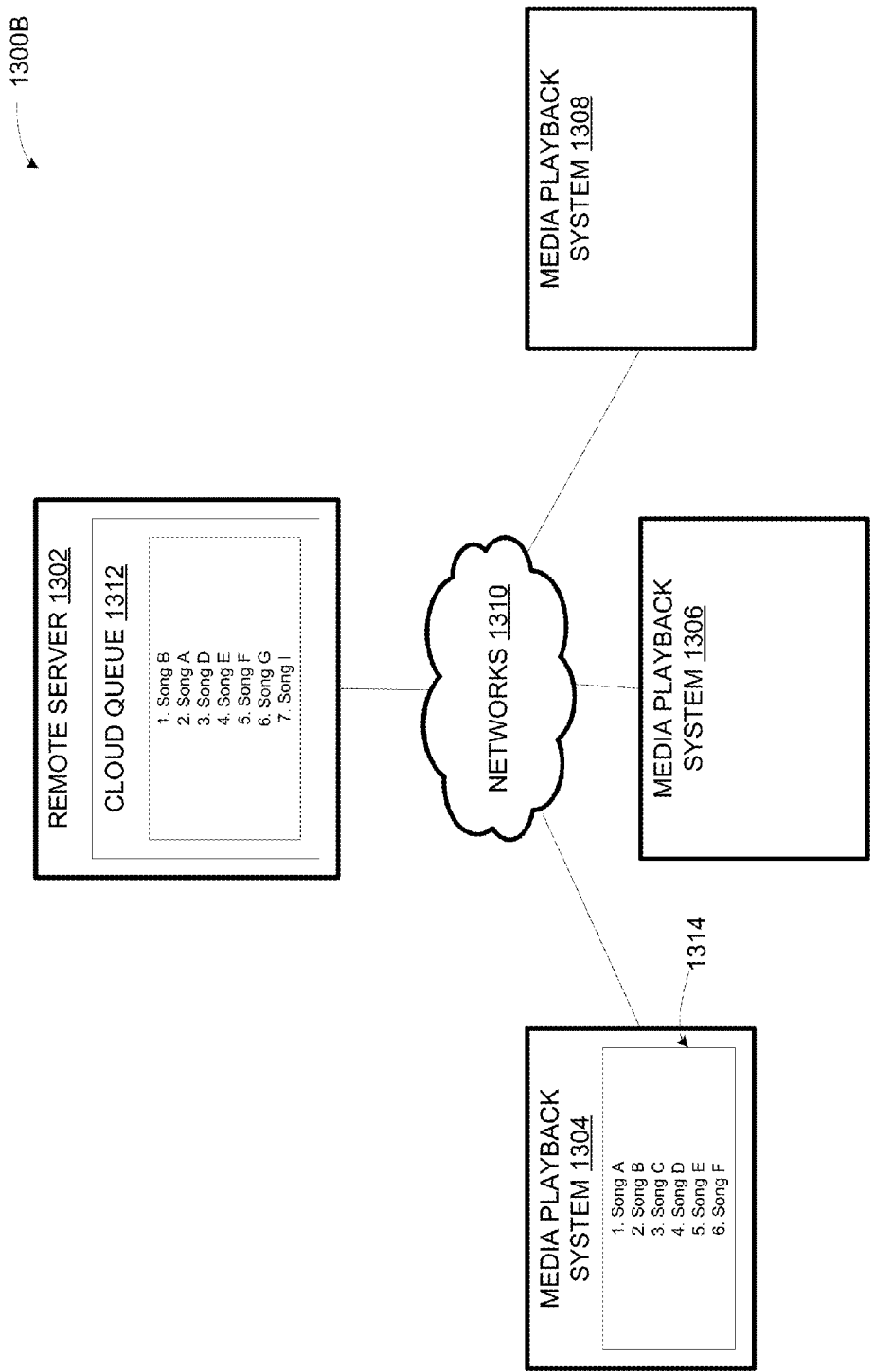
FIG. 13B shows a second instance of the second example environment in which certain embodiments may be practiced.

FIG. 13B illustrates an example environment 1300B which represents example environment 1300A after several modifications to cloud queue 1312. Compared with FIG. 13A, in FIG. 13B, cloud queue 1312 has been modified by re-ordering Song A and Song B from positions 1 and 2 to positions 2 and 1, respectively. Cloud queue 1312 has also been modified by removing Song C, such that subsequent media items have been re-positioned upwards in the queue. Finally, cloud queue 1312 has also been modified by adding Songs G and I in positions 6 and 7, respectively. The above modifications are described by way of example; other modifications to cloud queue 1312 are possible as well. Such modifications may be made by request of a media playback system, such as media playback system 1306 or 1308, or perhaps by a computing device that is not necessarily part of a media playback system (e.g., a smartphone, tablet, or laptop having a network interface). Media playback system 1304 may send a request to remote server 1302 for an indication of at least one media item from cloud queue 1312, so as to receive in response to the request an indication of cloud queue 1312 as modified.

In some cases, in connection with a modification to a cloud queue, the remote server may send, to the media playback systems that are associated with the cloud queue, an indication that the cloud queue has been modified. Such an indication may notify the media playback systems of the modification to the cloud queue. The indication may include a request or instruction to send to the remote server a request for an indication of at least one media item from the cloud queue. After receiving this indication, a media playback system may send a request for an indication of at least one media item based on receiving such a request or instruction. For instance, a device of a media playback system 1304 may send a request to remote server 1302 for an indication of at least one media item from cloud queue 1312 in response to receiving a request or instruction from remote server 1302 to send such a request.

In some embodiments, the media playback system may also send an indication of a particular media item to the remote server. Such a message may indicate to the remote server which media items of the remote queue to indicate in a message to the media playback system. For instance, the media playback system may send an indication of a particular media item that is currently being played by the media playback system. In such an example, sending the request for an indication of at least one media item from a remote queue may involve sending a request for a sequence of one or more media items from the remote queue that includes (e.g., begins with) the particular media item.

Referring to FIG. 13B by way of example, Song B at position 2 may be the currently playing media item at media playback system 1304 (or perhaps the currently playing media item of a zone of one or more grouped playback devices). Media playback system 1304 may send, to remote server 1302, a request for an indication of at least one media item from cloud queue 1312 and an indication of Song B at position 2. The indication of Song B at position 2 may indicate to remote server 1312 that media playback system 1304 is requesting a sequence of media items from cloud queue 1312 that include Song B at position 2. In some embodiments, the sequence may begin with Song B and include one or more subsequent media items in the queue. Alternatively, the sequence may begin with a media item that precedes Song B in the queue, and include Song B and include one or more media items that follow Song B within the queue. As another example, media playback system 1304 may send an indication of Song C at position 3. Remote server 1302 may determine that Song C has been removed from position 3, and so the sequence may include a sequence of media items beginning with Song D at position 3.

The number of media items to include in the sequence may vary by embodiment. Within examples, the number of media items may be greater than two (e.g., within the range of three to five), but may be greater than five in other examples. A sequence with a greater number of media items may facilitate skipping forward over a greater number of media items without requesting a new sequence, but such a sequence may increase the amount of data transmitted between the remote server and the media playback system. In some examples, the media playback system may send an indication of the number of media items to include in the sequence. Alternatively, the number of media items in the sequence may be pre-determined.

In some embodiments, the indication of the particular media item may be sent with the request, so as to reduce or eliminate delay between the remote server receiving the indication of the particular media item and the request. In some instances, the particular media item (e.g., the currently playing media item) may change during a delay between the remote server receiving the indication of the particular media item and the receiving the request for media items, which may result in unpredictable behavior. Alternatively, the indication of the particular media item may be sent separately from the request.

Within examples, the particular media item indicated in the message to the remote server may be a media item that is indicated by a playhead pointer. As noted above, a playhead pointer may be assigned to a position within a queue, such that it indicates a particular media item of the queue that is located at that position. And, as further noted, a playhead pointer may indicate a currently playing media item or, if playback is paused, a media item that will play when playback is resumed. For instance, referring to FIG. 13B, a local playhead pointer may be assigned to a position within local queue 1314, and the particular media item indicated in the message to remote server 1302 may be the media item that is indicated by the local playhead pointer.

As noted above, a computing system, such as a remote server, may maintain or have access to a plurality of queues. The media playback system may send, to the remote server, an identifier indicating the remote queue from among one or more queues that the remote server maintains or has access to. For instance, referring to FIG. 13B, media playback system 1304 may send to remote server 1302 an identifier indicating cloud queue 1312 from among a plurality of queues maintained by remote server 1302. The identifier may be included in a uniform resource identifier that identifies the cloud queue. Within examples, the media playback system may send the identifier in a message with the request for an indication of at least one media item from the remote queue, perhaps also with the indication of the particular media item and/or the number of media items to include in the sequence.

In some embodiments, the request for an indication of at least one media item from the queue may include a mechanism by which the remote server may authenticate access to the queue. For instance, each request for access may include an authorization token. Alternatively, each request for access may include one or more credentials.

b. Receive an Indication of One or More Media Items from the Remote Queue

At block 1204, the method involves receiving an indication of one or more media items from the remote queue. For instance, the device (e.g., a playback device, such as playback device 200 of FIG. 2) may receive an indication of one or more media items from the remote queue of media items. The device may receive the indication by way of a network interface. Within examples, the message may indicate the one or more media items from the remote queue by way of respective uniform resource identifiers that identify each media item.

As indicated above, remote server 1302 of FIG. 13B may receive, from media playback system 1304, a request for an indication of at least one media item from cloud queue 1312. After receiving such a request, remote server 1302 may send an indication of one or more media items from cloud queue 1312 to one or more devices of media playback system 1304. Media playback system 1304 may then receive the indication of one or more media items from cloud queue 1312.

The indication of one or more media items from the remote queue may include a sequence of one or more media items. Within examples, the sequence of one or more media items may include all of the media items of the queue or the sequence may include a subset (e.g., a "window") of media items from the queue. For example, the cloud queue may include a sequence of 150 media items, and the received indication of one or more media items may include a sequence of 10 media items from among the 150 media items.

As noted above, in some cases, the media playback system may send an indication of a particular media item (e.g., a media item that is being played by a playback device of the media playback system) so as to indicate to the remote server which media items to indicate back to the media playback system. For example, referring to FIG. 13B, media playback system 1304 may indicate Song E at position 4 with a request to remote server 1302. In response to the request, media playback system 1304 may receive an indication of a sequence of one or more media items that includes Song E at position 4. For instance, the sequence may include Song E at position 4, Song F at position 5, and Song G at position 6. Within examples, the sequence might include additional media items (e.g., media items preceding Song E at position 4 or additional media items that follow Song E at position 4).

c. Incorporate Indication of One or More Media Items into a Local Queue

At block 1206, the method involves incorporating an indication of the one or more media items into a local queue. For instance, the device (e.g., a playback device, such as playback device 200 of FIG. 2) may incorporate the indicated one or more media items into a local queue of media items that the device maintains or has access to. For instance, a playback device of a media playback system may maintain a local queue for a zone (that includes one or more grouped media playback devices) and may incorporate the indicated one or more media items into the local queue of the zone.

Within examples, incorporating the indicated one or more media items into the local queue may involve replacing one or more media items of the local queue with the indicated one or more media items. For instance, a device of a media playback system might maintain, in data storage, a local queue having a number of media items that is equivalent to the number of media items indicated. In such examples, the device may replace the media items of the local queue with the indicated media items. Alternatively, the device may replace a section of the local queue with the indicated one or more media items. For instance, the indicated one or more media items may include a sequence of five media items, and the device may replace a section of the local queue equivalent to five media items (e.g., positions 2-6 of a local queue).

In some embodiments, incorporating the indicated one or more media items into the local queue may involve inserting the indicated one or more media items into the local queue. For instance, the local queue may include a sequence of media items in positions 1-5, respectively. The indicated one or more media items may include a sequence of five media items, and the device may inserted the sequence of five media items in positions 6-10 of the local queue.

Figure 13C:
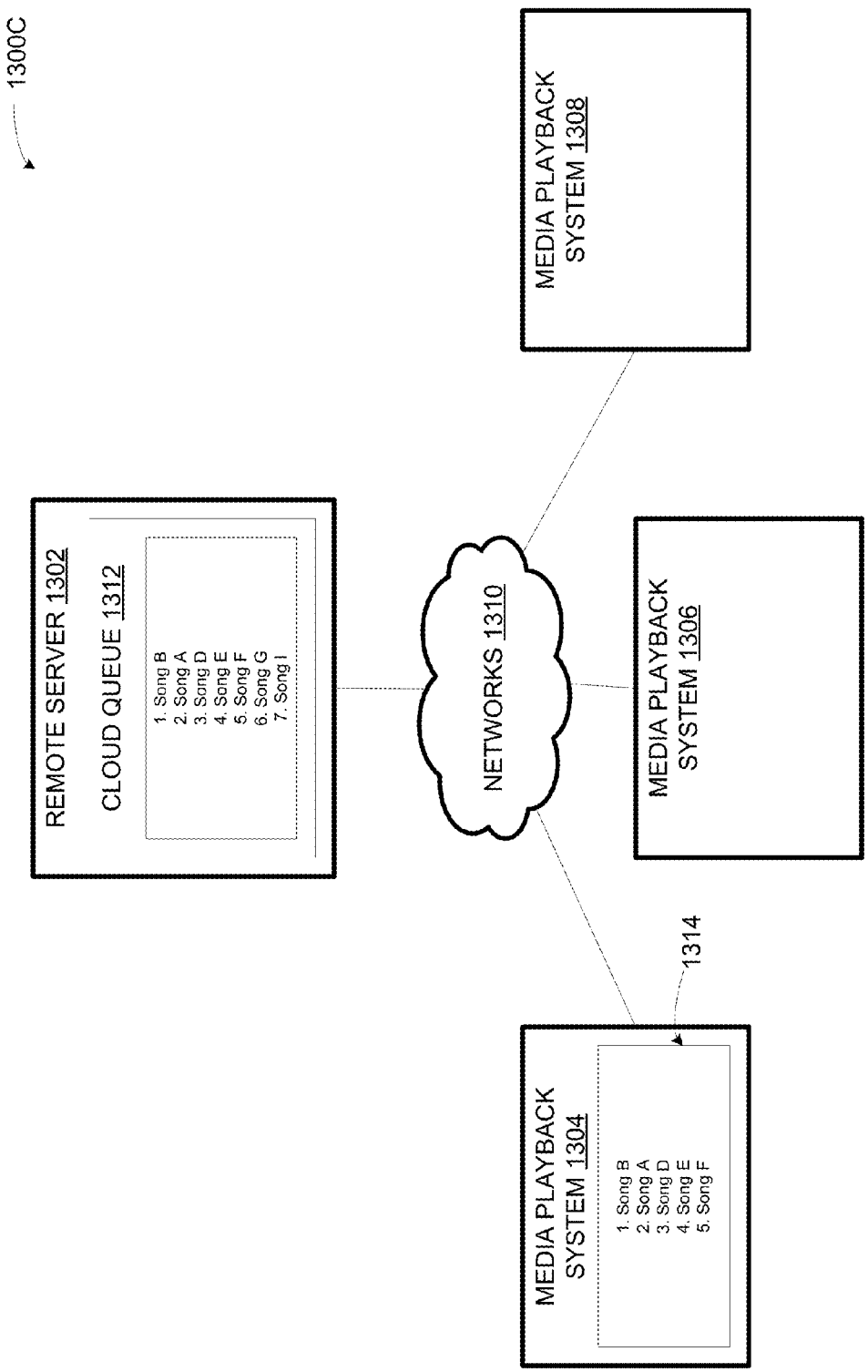
FIG. 13C shows a third instance of the second example environment in which certain embodiments may be practiced.

Alternatively, incorporating the indicated one or more media items into the local queue may involve a combination of inserting the indicated one or more media items into the local queue and removing other media items from the queue. For example, referring to FIG. 13B, media playback system 1304 may indicate Song B at position 2 with a request to remote server 1302. In response to the request, remote server 1302 may send media playback system a sequence of five media items. Because Song B and Song A have switched positions relative to the local queue, the sequence may begin at Song B in position 1 (perhaps as to not interrupt playback of Song B at the media playback system) and include four media items following Song B. As shown in FIG. 13C, media playback system 1304 may then incorporate the sequence of media items into local queue 1314 by adding or removing media items as necessary so as to synchronize the indicated portion of local queue 1314 with the relevant portion of cloud queue 1312.

In some embodiments, after receiving the indication of one or more media items from the remote queue of media items, a playback device of the media playback system may send, to one or more additional playback devices, an indication of the one or more media items from the remote queue of media items. Such a message may propagate the current configuration of the cloud queue as indicated by the indication of one or more media items to the one or more additional playback devices. After receiving such an indication, a playback device may incorporate the indicated one or more media items into a respective local queue.

As noted above, a media playback system may include a control device (e.g., control device 300 of FIG. 3) that may be configured to cause a graphical interface to display a controller interface (e.g., controller interface 400 of FIG. 4). In some cases, such a control device may send, to the device that maintains the local queue (e.g., a playback device), a request for an indication of the one or more media items from the remote queue of media items for display. After receiving such a request, the device may send, to the control device, an indication of at least one of the one or more media items from the remote queue of media items. Within examples, the device may retrieve the at least one of the one or more media items from a local queue (e.g., by reference to data representing the local queue). Alternatively, the device may identify the at least one of the one or more media items from the received indication of the one or more media items from the remote queue. Other examples are possible as well.

In some cases, after receiving the indication of at least one of the one or more media items from the remote queue of media items, the control device may cause a graphical interface to display an indication of the media items. For instance, a control device may display a representation of the media items in a playback queue region of a controller interface (e.g., playback queue region 440 of FIG. 4). The indicated media items may include all of the media items of the remote queue or a subset of those media items.

As noted above, in some cases, a remote server may notify a media playback system that the cloud queue has been modified. Such a notification may take the form of a request for the playback device to send a request for an indication of at least one media item from the remote queue of media items. Upon receiving such a request, the playback device may detect whether the media item of the local queue that is currently playing has changed since the previous request for an indication of at least one media item from the remote queue was sent. For instance, a skip forward command received by the playback device may have caused the playback device to advance playback to the next media item of the queue. Based on detecting that a different media item is being played (or that a different media item is indicated by a playhead pointer), the playback device may send to the remote server a request for an indication of at least one media item from the remote queue of media items. The message containing the request may include an indication of the now playing media item, so as to indicate to the remote server which media items to indicate in a message to the media playback system.

In some embodiments, a playback device device may send a message indicating that playback of the particular media item (i.e., the currently playing media item) has finished. For instance, in operation, a playback device may be configured to detect when playback of a media item finishes, and notify the remote server by way of a message. After receiving a message indicating that playback of the currently playing media item has finished, the remote server may determine whether the indicated one or more media items has changed (e.g., whether any of the media items within the sequence of media items has been removed or re-ordered or whether one or more media items have been added so as to change the media items of the sequence). Based on determining that the indicated one or more media items has changed, the remote server may notify the playback device that the cloud queue has been modified, perhaps by sending a request for the playback device to send a request for an indication of at least one media item from the remote queue of media items.

In some cases, the media playback system may switch to different content (e.g., a different queue from the cloud queue), perhaps based on a message or instruction that causes the media playback system to change content. The different content might be a different cloud queue, or perhaps a local queue (e.g., a local queue that is not synchronized or associated with a cloud queue). The media playback system may notify the remote server that the content has changed, perhaps by sending the remote server a message indicating that the remote queue is not the active queue at the playback device. After receiving such a request, the remote server may cease performing one or more of the above operations involved in keeping the cloud queue synchronized with the local queue. For instance, the remote server may cease notifying the media playback system of changes to the cloud queue.

VI. Second Example Techniques to Synchronize Queues

Figure 14:
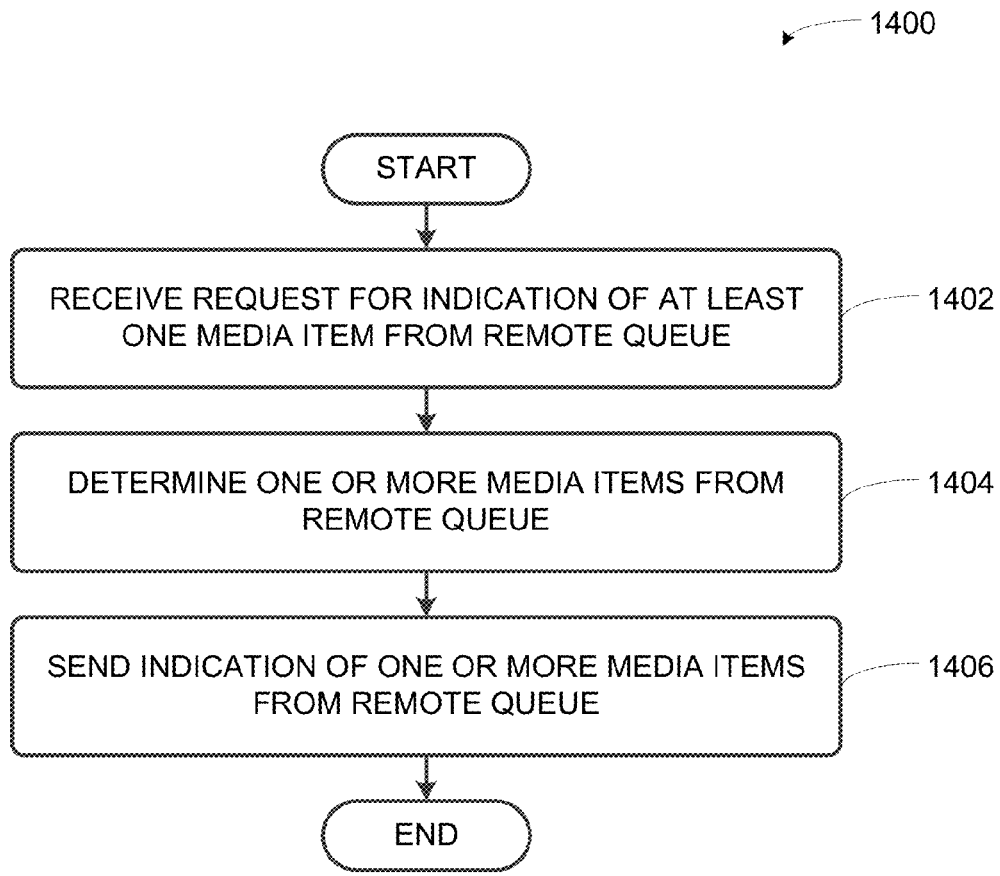
FIG. 14 is another example flow diagram to synchronize a local queue with a cloud queue.

As noted above, embodiments described herein may involve synchronizing a first queue (e.g., a cloud queue) and one or more second queues (e.g., local queues). FIG. 14 illustrates an example method to synchronize a local queue with a cloud queue.

a. Receive Request for an Indication of at Least One Media Item from a Remote Queue At block 1402 of method 1400, the method involves receiving a request for an indication of at least one media item from a remote queue of media items. For instance, a computing system (e.g., a remote server) may receive such a request from a device of a media playback system. The device and the computing system may be separated by one or more networks, such as one or more local area networks and/or one or more wide area networks (e.g., the Internet), and the request may be received by way of a network interface of the device. The computing system may maintain or have access to the remote queue. In some cases, the computing system may be involved in providing a cloud service, and the remote queue may be referred to as a "cloud queue."

By way of example, referring back to FIG. 13A, a device of media playback system 1304 may send to remote server 1302 a request for an indication of at least one media item from a remote queue of media items. The device may send the request via the one or more networks 1310. Remote server 1302 may then receive the request from media playback system 1304.

The computing system may also receive an indication of a particular media item that is being played by one or more playback devices of a media playback system (e.g., by a zone of one or more grouped media playback systems). As noted above, such an indication may assist the computing system in determining which media items to indicate in a message to the media playback system. The computing system may store an indication of the particular media item in data storage.

As indicated above, in some cases, the computing system may notify a media playback system that the cloud queue has been modified. For instance, in operation, the computing system may detect modifications to the remote queue. Such a notification may take the form of a request for the playback device to send a request for an indication of at least one media item from the remote queue of media items. Upon receiving such a request, the playback device may send a request for an indication of at least one media item from the cloud queue.

b. Determine One or More Media Items from Cloud Queue

At block 1404, the method involves determining one or more media items from the remote queue. For instance, the computing system may determine a sequence of one or more media items that includes the particular media item (e.g., the media item that the media playback system is currently playing or perhaps, if playback is paused, a media item that will play when playback is resumed). Referring back to FIG. 13A, the currently playback media item at media playback system 1304 may be Song B at position 2 within cloud queue 1312 and the computing system may determine a sequence of media items that includes Song B (e.g., a sequence of that includes the media items of positions 2-4).

Determining the one or more media items may involve searching the remote queue for the particular media item. The position of the particular media item may change when the queue is modified (e.g., when media items are added to the queue, removed from the queue, or re-ordered within the queue). Given that the particular media item is in the same position in the remote queue as in the local queue, the computing system may determine a sequence that includes that position (e.g., a sequence that begins with that position). Alternatively, in circumstances in which the particular media item is in a different position, the computing system may determine a sequence of media items that includes the particular media item and one or more media items that precede or follow the new position of the particular media item.

c. Send Indication of One or More Media Items from Remote Queue

At block 1406, the method involves sending an indication of the determined one or more media items from the remote queue. For instance, the computing system may send to a device of the media playback system (e.g., a playback device, such as playback device 200 of FIG. 2) an indication of one or more media items from the remote queue of media items. The computing system may send the indication by way of a network interface. Within examples, the message may indicate the one or more media items from the remote queue by way of respective uniform resource identifiers that identify each media item.

As noted above, in operation, the computing system may detect modifications to the cloud queue. In some embodiments, the computing system may detect modifications to the cloud queue that affect the determined one or more media items from the cloud queue, as modification of these media items may affect playback by the media playback system of the local queue that is synchronized to the cloud queue. In response to detecting a modification that affects the determined one or more media items from the cloud queue, the computing system may send, to the media playback system, a message indicating that the determined one or more media items have been affected. Such a message may take the form of a request for the playback device to send a request for an indication of at least one media item from the remote queue of media items. Based on a message indicating that the determined one or more media items have been affected, the media playback system may send a request for an indication of at least one media item from the remote queue of media items. In some embodiments, the computing system may pre-emptively determine one or more media items from the modified remote queue and send the determined one or more media items from the modified remote queue to the media playback system.

In some embodiments, the device may send a message indicating that playback of the particular media item (i.e., the currently playing media item) has finished. For instance, in operation, a playback device may be configured to detect when playback of a media item finishes, and notify the remote server by way of a message. Accordingly, in some instances, the computing system may receive a message indicating that playback of the particular media item has finished. Based on receiving the message indicating that playback of the particular media item has finished, the computing system may perform one or more operations. For instance, the computing system may determine a media item that is queued after the particular media item in the remote queue. The computing system may further update the stored data indicating the current track of the remote queue to indicate the determined media item that is queued after the particular media item.

As noted above, in some cases, the media playback system may change to content that is different from the remote queue (e.g., to another cloud queue or to a local queue, or perhaps to a streaming radio station, among other examples). In some embodiments, such changing of the content may lead the media playback system to send a message indicating that the remote queue is not the active queue at the media playback system (or perhaps at a zone of one or more grouped media playback devices of the media playback system). The computing system may receive such a message, and based on receiving the message, remove the media playback system from a list of media systems that are associated with the cloud queue. Media playback systems that are configured to play back media items of the remote queue (e.g., that have the remote queue configured as the active queue of a zone of playback devices) may be referred to as subscribers. Referring back to FIG. 13A, media playback system 1304, 1306, and/or 1308 may have cloud queue 1312 configured as the active queue and as such, be listed as subscribers to cloud queue 1312. In such embodiments, removing the media playback system from a list of media systems that are associated with the cloud queue may involve removing media playback system 1304 from the list of subscribers to cloud queue 1312.

Figure 15:
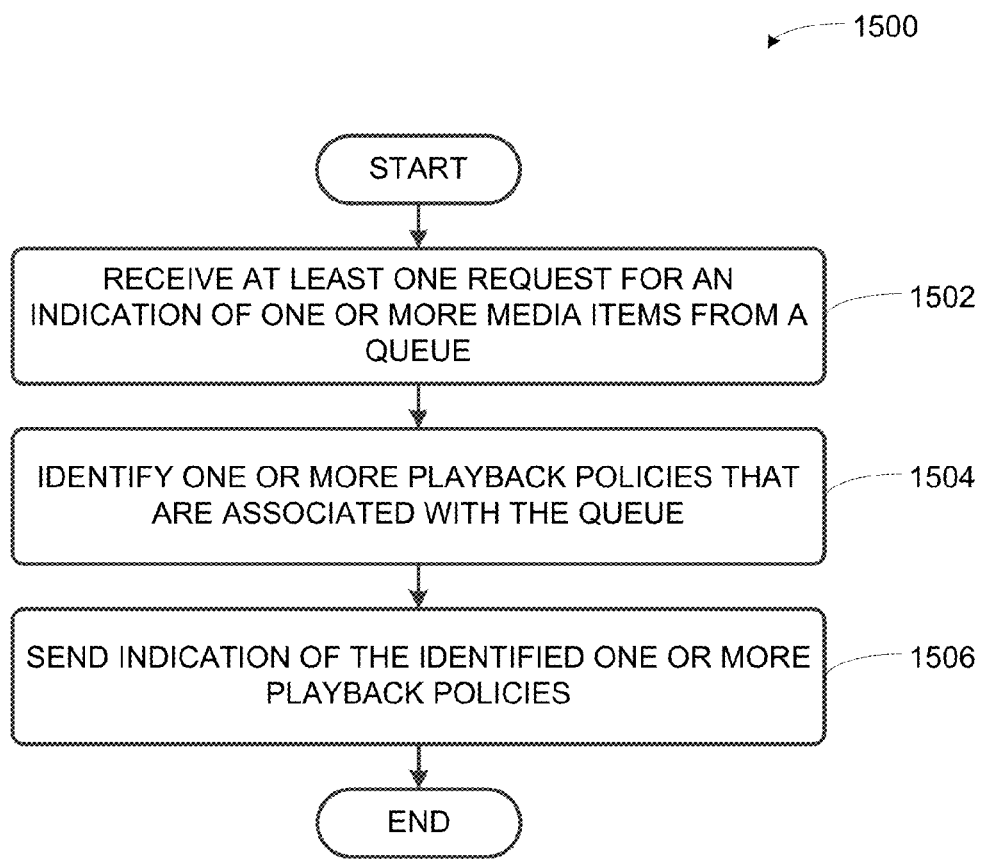
FIG. 15 is an example flow diagram to identify playback policies associated with a queue.

VII. Example Techniques to Restrict Playback of a Queue According to One or More Playback Policies As noted above, embodiments described herein may involve restricting playback of a queue according to one or more playback policies. For example, an example computing system may maintain or have access a cloud queue. One or more playback policies may be associated with the cloud queue and restrict how that cloud queue is accessed (e.g., played back) by remote entities. Playback policies may restrict certain features related to playback, such as skipping forward or jumping to another track. Within examples, playback policies may be used to enforce licensing agreements for media items within the queue. FIG. 15 illustrates an example method to identify playback policies associated with the cloud queue and provide an indication of those playback policies to a remote entity (e.g., a media playback system).

a. Receive at Least One Request for an Indication of One or More Media Items from a Queue At block 1502 of method 1500, the method involves receiving at least one request for an indication of one or more media items from a queue. For instance, a computing system (e.g., a remote server) may receive such a request from a device of a media playback system. Such a request may also be referred to as a request for an indication of at least one media item. The device and the computing system may be separated by one or more networks, such as one or more local area networks and/or one or more wide area networks, and the request may be received via a network interface. The computing system may maintain or have access to the remote queue. The remote queue may be referred to as a "cloud queue."

Figure 16:
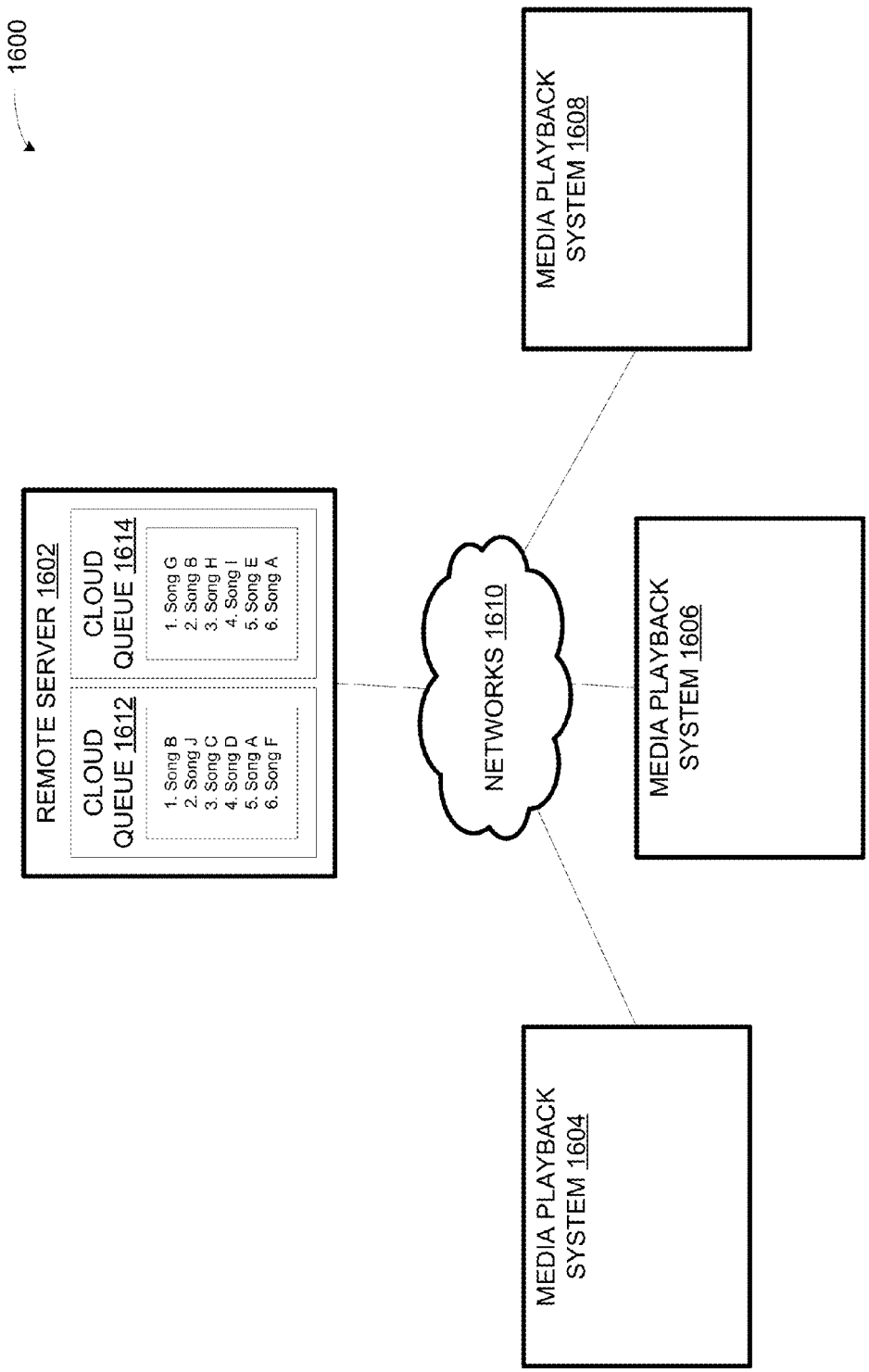
FIG. 16 shows a third example environment in which certain embodiments may be practiced.

FIG. 16 illustrates an example environment 1600 that includes a remote server 1602 that maintains cloud queue 1612 and 1614. Cloud queues 1612 and 1614 respectively represent example queues of media items, which might be maintained by a cloud service. Cloud Queue 1312 includes a sequence of media items, including, in order, representative media items Song B, Song J, Song C, Song D, Song A, and Song F. Cloud queue 1314 also includes a sequence of media items, including, in order, representative media items Song G, Song B, Song H, Song I, Song E, and Song A. As shown in FIG. 16, remote server 1602 is connected to media playback system 1604, media playback system 1606, and media playback system 1608 by one or more networks 1610. In operation, one or more of media playback system 1604, media playback system 1606, and media playback system 1608 may connect to remote server 1602 to access cloud queue 1612 and/or cloud queue 1614. As noted above, such access might include playback, display, or modification of cloud queue 1612 and/or cloud queue 1614, among other types of access.

As noted above, in some embodiments, a media playback system may be associated with a cloud queue such that the cloud queue becomes available for the media playback system to access. For example, media playback system 1604 may be associated with cloud queue 1612 and cloud queue 1614 such that both cloud queue 1612 and cloud queue 1614 are available for media playback system 1604 to access. As noted above, either one of the two queues might be active at any time on the media playback system. Within examples, media playback system 1604 may have two or more zones of grouped playback devices, and each of cloud queue 1612 and cloud queue 1614 may be active on a respective zone. Continuing the example, media playback system 1606 may be associated with cloud queue 1614.

Within examples, media playback systems 1604 and 1606 may send, to remote server 1602 respective requests for an indication of one or more media items from a queue. As noted above, media playback systems may send such requests to identify the media items within a cloud queue and perhaps synchronize those items with a local queue. In some cases, media playback systems 1604 and 1606 may request an indication of one or more media items from the same queue. For instance, remoter server 1602 may receive, from media playback systems 1602 and 1604, respective requests for an indication one or more media items from cloud queue 1614. Alternatively, the media playback systems may request an indication of one or more media items from different queues. For example, remoter server 1602 may receive, from media playback systems 1602 and 1604, a request for an indication one or more media items from cloud queue 1612 and a request for an indication one or more media items from cloud queue 1614, respectively. Other examples are possible as well.

b. Identify One or More Playback Policies that are Associated with the Queue

At block 1504, the method involves identifying one or more playback policies that are associated with the queue. For instance, after receiving a request for an indication of one or more media items from a queue, the computing system may determine one or more media items from the remote queue, perhaps based on a media items indicated with the request. The computing system may then identify one or more playback policies that restrict at least one aspect of playback of at least one of the one or more media items. The computing system may maintain or have access to data indicating the playback policies associated with each queue.

By restricting playback of one or more media items of a queue, a playback policy may restrict usage of a feature that is available for other media items or queues. For example, a playback policy may restrict one or more of: skipping playback of a media item (i.e., skipping over a media item in the queue), replaying a previously played media item, seeking forward during playback, seeking backward during playback, or replaying a currently playing media item.

As noted above, a control device of a media playback system may provide a controller interface that includes various controls. Some controls (e.g., transport controls) may provide options that control playback. A playback policy may restrict these options. For instance, a playback policy may restrict one or more of: a shuffle option, a repeat option, a skip forward option, a skip backwards option, a seek forward option, or a seek backward option. When such options are restricted, a control device may disable and/or remove controls linked to the options from the controller interface.

Some example playback policies may restrict modification of a pre-determined playback order in which the media items are sequenced. As noted above, a queue of media items may be ordered or sequenced, such that the playback order of the media items of the queue is pre-determined. For instance, referring back to FIG. 7, each media items of queue 700 may correspond to a position within that queue, and playback of queue 700 may proceed in order from one media item to the media item at the next position within the queue.

Within examples, respective playback policies may apply to each media playback system that accesses a particular queue. For instance, referring back to FIG. 16, after receiving, from media playback systems 1604 and 1606, a request for an indication of one or more media items from cloud queue 1604, remote server 1602 may identify one or more first playback policies corresponding to media playback system 1604 and one or more second playback policies corresponding to media playback system 1604. In such examples, the playback policies may be applied on system-by-system basis, such that each set of policies are identified for a media playback system based on the identity of the media playback system.

In some embodiments, playback policies may be identified on the basis of a user account. As noted above, each media playback system may be registered with or otherwise associated with one or more user accounts, perhaps with one particular account being active at a given time. Referring to FIG. 16, media playback systems 1604 and 1606 may be associated with a first user account and a second user account, respectively. In such an example, remote server 1602 may identify one or more first policies corresponding to the first user account that is associated with media playback system 1604 and identify one or more second policies corresponding to the second user account that is associated with media playback system 1606. Accordingly, the playback policies applied to each media playback system may be based on the user account associated with each system. For instance, the first user account may be a "premium" (e.g., paying) subscriber and so the first playback policies might restrict playback very little or not at all. The second user account may be a "standard" (e.g., non-paying) subscriber and so the second playback policies may further restrict playback relative to the first playback policies. Other examples are possible as well.

Playback policies may be identified on a queue-by-queue basis. For example, different rights-holders may provide cloud queues for playback by media playback systems. Different rights-holders may desire to restrict playback of these queues in different ways. Further, a rights-holder may desire to restrict playback of queues containing different content in different ways. As noted above, remoter server 1602 may receive, from media playback systems 1602 and 1604, a request for an indication one or more media items from cloud queue 1612 and a request for an indication one or more media items from cloud queue 1614, respectively. In such an example, remoter server 1602 may identify one or more first policies corresponding to cloud queue 1612 and identify one or more second policies corresponding to cloud queue 1614.

Additional example playback policies are described in U.S. patent application Ser. No. 14/330,825, titled "Policies for Media Playback," which is hereby incorporated in its entirety.

c. Send Indication of the Identified One or More Playback Policies

At block 1506, the method involves sending an indication of the identified one or more playback policies. For instance, a computing system may send, to each media playback system that requested an indication of one or more media items from a queue, an indication of one or more playback policies that were identified. Referring back to FIG. 16, remote server 1602 may send, to media playback systems 1604 and 1606, an indication of the one or more first policies and the one or more second policies, respectively.

In some embodiments, the media playback system may enforce playback policies. For instance, a media playback system may include a playback device that maintains a local queue which is synchronized to a cloud queue. The computing system may send to this playback device an indication of one or more media items from the cloud queue, and an indication of the identified one or more playback policies associated with the cloud queue. The playback device may apply the one or more playback policies by restricting at least one aspect of playback of the local queue (per the identified one or more playback policies).

Alternatively, the computing system may enforce the playback policies. After identifying a playback policy, the computing system may determine that the identified one or more policies restrict playback of at least one of the one or more media items and restrict playback of at least one of the one or more media items according to the identified one or more policies. For example, to skip forward to a given media item of a cloud queue, a media playback system may send a request for an indication of a sequence of one or more media items from the queue that includes the given media item. The computing system may determine whether skipping forward is restricted by the playback policy, and if so, send, to the media playback system, an indication that playback at least one of the one or more media items is restricted (perhaps in lieu of the requested indication of an indication of a sequence of one or more media items that includes the given media item).

IV. Example Techniques to Display Graphical Indication of Playback Policies

Figure 17:
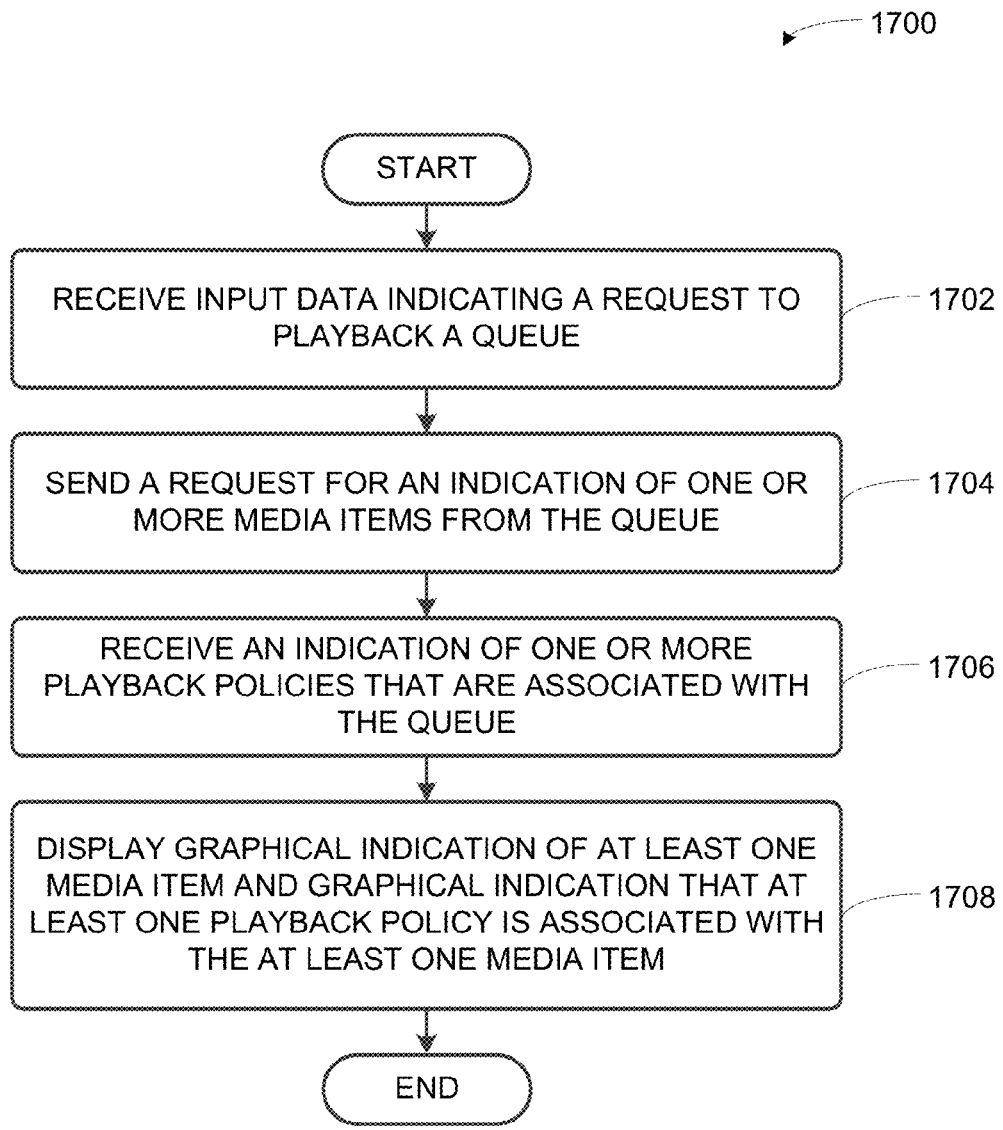
FIG. 17 is an example flow diagram to display a graphical indication of a playback policy.

FIG. 17 shows an example method 1700 to display of a graphical indication of a playback policy.

a. Receive Input Data Indicating a Request to Playback a Queue

At block 1702 of method 1700, a control device of a media playback system may receive input data indicating a request to playback a queue of media items. For instance, the control device may display a controller interface, such as controller interface 400, that includes controls to initiate playback (e.g., a "Play" or a "Play/Pause" control). The "Play" or a "Play/Pause" control may be contextual. For example, the controller interface may include an indication of one or more cloud queues that the media playback system is currently accessing or has accessed. For instance, the controller interface may display a cloud queue that the media playback system is currently accessing (i.e., an "active" queue) in a playback queue region, such as a playback queue region 440 of FIG. 4. Input data generated by a "Play" control may indicate a request to playback the active queue.

In other cases, a playback device may have an interface that includes various selectable controls to control playback of a queue (e.g., a cloud queue). Within examples, such controls may control playback on the playback device, or perhaps on the playback device and one or more additional playback devices that are grouped (e.g., into a zone of playback devices configured to play back media items in synchrony). Selection of such controls may generate input data indicative of the selected control. The playback device may send an indication of this data to the control device. The control device may control playback according to the selected control.

b. Send a Request for an Indication of One or More Media Items from the Queue

At block 1704, the method involves sending a request for an indication of one or more media items from the queue. For instance, a control device may send such a request to a remote server (e.g., remote server 1602 of FIG. 16). Alternatively, a control device may send the request to a playback device that maintains a local queue.

c. Receive an Indication of One or More Playback Policies that are Associated with the Queue.

At block 1706, the method involves receiving an indication of one or more playback policies that are associated with the queue. Within examples, a control device may receive such an indication from a remote server or a playback device. The control device may also receive an indication of at least one media item from the queue (e.g., a sequence (or "window") of media items from a cloud queue or a local queue.

d. Display Graphical Indication of at Least One Media Item and Graphical Indication that at Least One Playback Policy is Associated with the at Least One Media Item At block 1708, the method involves causing a graphical interface to display a graphical indication of at least one media item and a graphical indication that at least one playback policy is associated with the at least one media item.

Figure 18A:
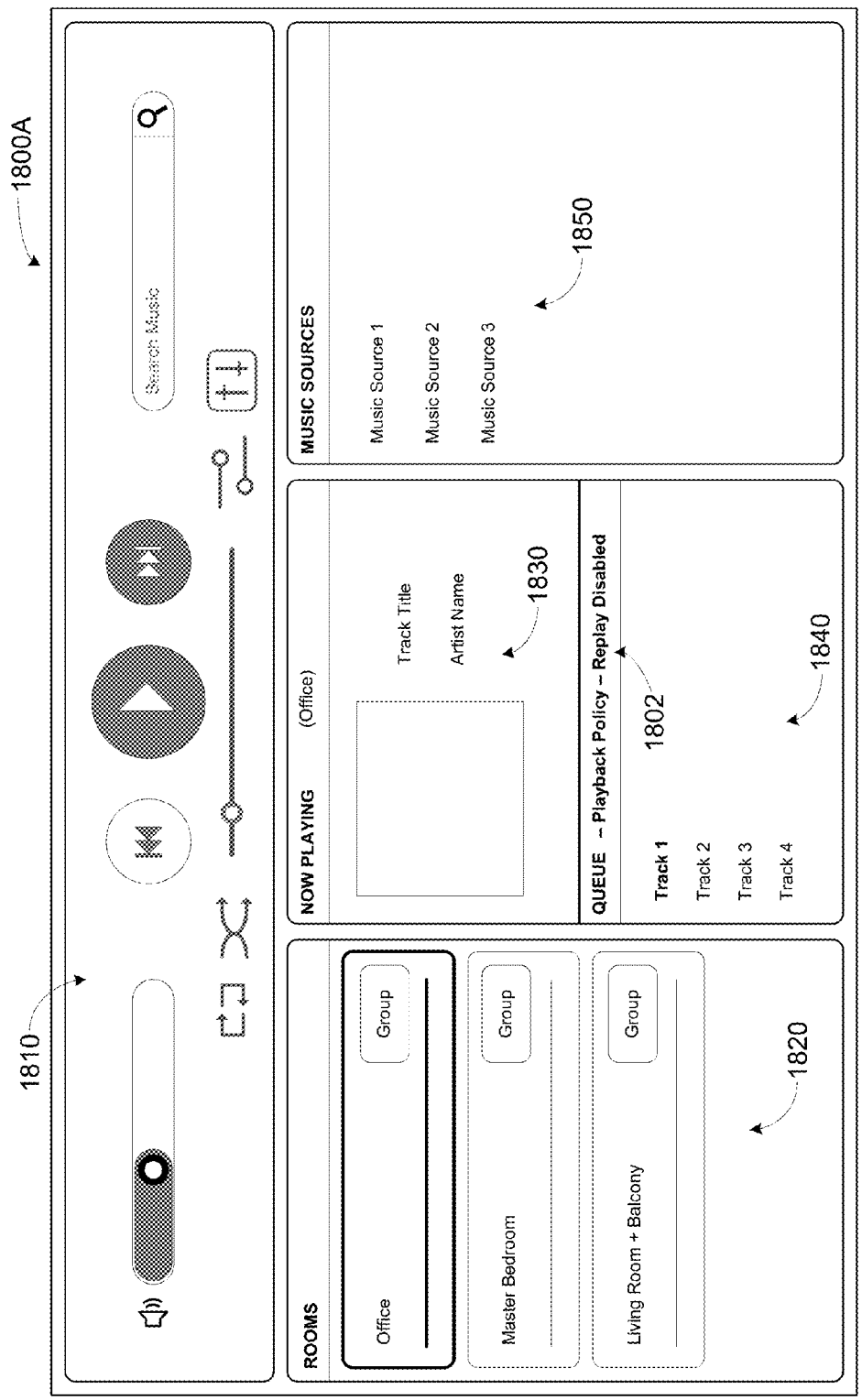
FIG. 18A shows an example controller interface that includes a graphical indication of a playback policy.

FIG. 18A shows a controller interface 1800. As shown, controller interface 1800 includes a playback control region 1810, a playback zone region 1820, a playback status region 1830, a playback queue region 1840, and an audio content sources region 1850, which may correspond, respectively, to the playback control region 410, the playback zone region 420, the playback status region 430, the playback queue region 440, and the audio content sources region 450 of controller interface 400 shown in FIG. 4. The playback queue region 1840 includes an indication of media items of a queue (e.g., a cloud queue or a local queue), which might have been indicated in a message from a remote server or a playback device.

Controller interface 1800A of FIG. 18A also includes several example graphics that indicate that at least one playback policy is associated with at least one media item of the queue. As shown, playback queue region 1840 includes text 1802 that indicates that a playback policy is associated with the media items shown in playback queue region 1840. The text 1802 indicates, by way of example, that replay of previously played media items is disabled. Such text might indicate the restrictions placed on playback by the associated playback policy. In some cases, the control device may cause the graphical interface to display a graphical indication that one or more graphical controls that enable respective playback options are restricted. For instance, the control device may disable and/or change the appearance of the control to skip backward of playback control region 1810, so as to indicate that the playback policy restricts replay of previously played media items. As shown in FIG. 18A, the colors of the control to skip backward (so as change playback to previously played media items) are inverted as compared with the enabled control to skip forward.

Figure 18B:
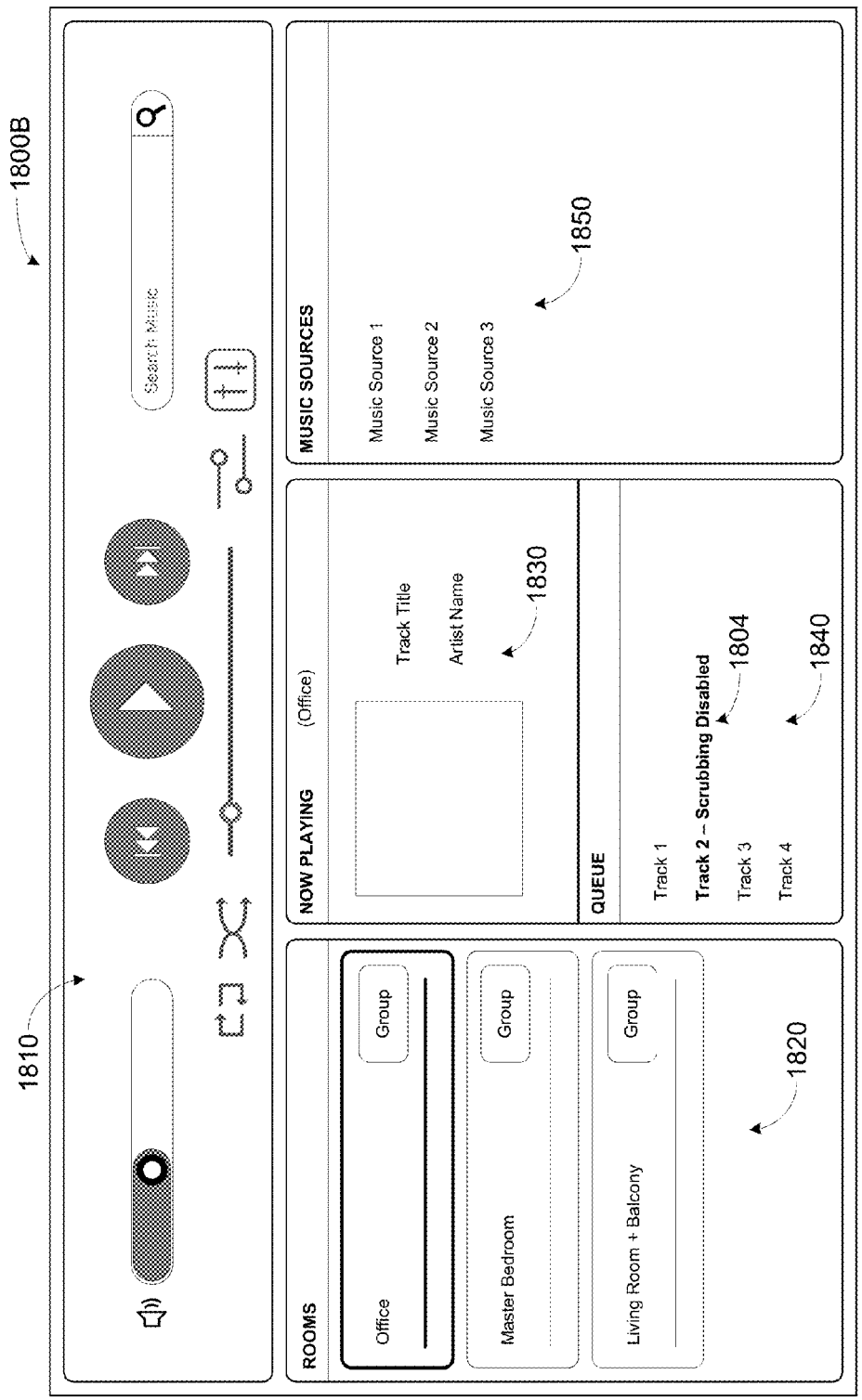
FIG. 18B shows another example controller interface that includes a graphical indication of a playback policy.

Controller interface 1800B of FIG. 18B shows another example graphic that indicates that at least one playback policy is associated with at least one media item of the queue. As shown, playback queue region 1840 includes text 1804 that indicates that a playback policy is associated with a media item ("Track 2") shown in playback queue region 1840. The text 1802 indicates, by way of example, that scrubbing within the media item is disabled.

Within examples, a control device may detect when the current media item (e.g., the track indicated by a playhead pointer) changes (e.g., from a first media item to a second media item), and cause the graphical interface to display an indication of one or more playback policies that are associated with the current media item. For instance, referring to FIG. 18B, playback of the queue may progress from "Track 2" to "Track 3." The control device may detect that the current track has changed, and cause the graphical interface to display the policies (if any) associated with Track 3. Further, control device may cause the policies associated with Track 2 to be removed from the interface (perhaps to be replaced with the policies associated with Track 3). Within examples, the respective policies associated with successive media items may be displayed for an overlapping period of time, so as to provide a preview of the policies associated with the next media item.

Some playback polices may restrict display of a queue to certain media items within the queue. For instance, a playback policy may restrict display of the queue to the currently playing media item. Another playback policy may restrict display of the queue to the currently playing media item and the one or more media item to be played back, such that a user might be unable to view an indication of all of the media items of the queue, but might be able to view of a previous of the next track(s). A further example playback policy may restrict display to the media item that was previously played (perhaps in addition to the currently playing media item and/or one or more media items scheduled to be played next). Within examples, the control device may enforce such policies. For example, the control device may determine that a playback policy restricts display of certain media items and not display those media items according to the policy.

V. Conclusion

The description above discloses, inter alia, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, some example techniques may involve a "playhead." In one aspect, a method is provided. The method may involve receiving, from a media playback system, a request for an indication of a playhead pointer for a particular queue of media items. The method may also involve identifying a position of a playhead pointer within the particular queue of media items. Each position in the queue may correspond to a media item. The method may further involve sending, to the media playback system, an indication of the playhead pointer. The indication of the playhead pointer may indicate the assigned position of the playhead pointer.

In another aspect, a computing system is provided. The computing system includes a network interface, at least one processor, a data storage, and program logic stored in the data storage and executable by the at least one processor to perform functions. The functions may include receiving, from a media playback system, a request for an indication of a playhead pointer for a particular queue of media items. The functions may also include identifying a position of a playhead pointer within the particular queue of media items. Each position in the queue may correspond to a media item. The functions may further include sending, to the media playback system, an indication of the playhead pointer. The indication of the playhead pointer may indicate the assigned position of the playhead pointer.

In yet another aspect, a non-transitory computer readable memory is provided. The non-transitory computer readable memory has stored thereon instructions executable by a computing device to cause the computing device to perform functions. The functions may include receiving, from a media playback system, a request for an indication of a playhead pointer for a particular queue of media items. The functions may also include identifying a position of a playhead pointer within the particular queue of media items. Each position in the queue may correspond to a media item. The functions may further include sending, to the media playback system, an indication of the playhead pointer. The indication of the playhead pointer may indicate the assigned position of the playhead pointer.

In yet another aspect, another method is provided. The method may involve receiving, by a control device of a media playback system, input data that associates a zone of one or more playback devices with a particular queue of media items. The method may also involve sending, by the control device to a computing system, a request for an indication of a playhead pointer for the particular queue of media items. The method may further involve receiving, by the control device, the requested indication of the playhead pointer. The indication of the playhead pointer may indicate an assigned position of the playhead pointer in the particular queue of media items and assigned position may correspond to a media item at that position in the particular queue.

In another aspect, a device is provided. The device includes a network interface, at least one processor, a data storage, and program logic stored in the data storage and executable by the at least one processor to perform functions. The functions may include receiving, by a control device of a media playback system, input data that associates a zone of one or more playback devices with a particular queue of media items. The functions may also include sending, by the control device to a computing system, a request for an indication of a playhead pointer for the particular queue of media items. The functions may further include receiving, by the control device, the requested indication of the playhead pointer. The indication of the playhead pointer may indicate an assigned position of the playhead pointer in the particular queue of media items and assigned position may correspond to a media item at that position in the particular queue.

In yet another aspect, a non-transitory computer readable memory is provided. The non-transitory computer readable memory has stored thereon instructions executable by a computing device to cause the computing device to perform functions. The functions may include receiving, by a control device of a media playback system, input data that associates a zone of one or more playback devices with a particular queue of media items. The functions may also include sending, by the control device to a computing system, a request for an indication of a playhead pointer for the particular queue of media items. The functions may further include receiving, by the control device, the requested indication of the playhead pointer. The indication of the playhead pointer may indicate an assigned position of the playhead pointer in the particular queue of media items and assigned position may correspond to a media item at that position in the particular queue.

Also as indicated above, example techniques may involve synchronization of the cloud queue. In one aspect, a method is provided. The method may involve sending, to a remote server, (i) a request for an indication of at least one media item from a remote queue of media items, and (ii) an indication of a particular media item that is being played by the playback device. The method may also involve receiving an indication of one or more media items from the remote queue of media items. The one or more media items may include the particular media item is being played by the playback device. The method may further involve incorporating an indication of the one or more media items into a local queue of media items.

In another aspect, a device is provided. The device includes a network interface, at least one processor, a data storage, and program logic stored in the data storage and executable by the at least one processor to perform functions. The functions may include sending, to a remote server, (i) a request for an indication of at least one media item from a remote queue of media items, and (ii) an indication of a particular media item that is being played by the playback device. The functions may also include receiving an indication of one or more media items from the remote queue of media items. The one or more media items may include the particular media item is being played by the playback device. The functions may further include incorporating an indication of the one or more media items into a local queue of media items.

In yet another aspect, a non-transitory computer readable memory is provided. The non-transitory computer readable memory has stored thereon instructions executable by a computing device to cause the computing device to perform functions. The functions may include sending, to a remote server, (i) a request for an indication of at least one media item from a remote queue of media items, and (ii) an indication of a particular media item that is being played by the playback device. The functions may also include receiving an indication of one or more media items from the remote queue of media items. The one or more media items may include the particular media item that is being played by the playback device. The functions may further include incorporating an indication of the one or more media items into a local queue of media items.

In yet another aspect, another method is provided. The method may involve receiving, from a media playback system, (i) a request for an indication of at least one media item from a remote queue of media items, and (ii) an indication of a particular media item that is being played by a playback device of the media playback system. The method may also involve determining one or more media items from the remote queue. The determined one or more items may include the particular media item. The method may further involve sending an indication of the determined one or more media items from the remote queue to the media playback system.

In another aspect, a device is provided. The device includes a network interface, at least one processor, a data storage, and program logic stored in the data storage and executable by the at least one processor to perform functions. The functions may include receiving, from a media playback system, (i) a request for an indication of at least one media item from a remote queue of media items, and (ii) an indication of a particular media item that is being played by a playback device of the media playback system. The functions may also include determining one or more media items from the remote queue. The determined one or more items may include the particular media item. The functions may further include sending an indication of the determined one or more media items from the remote queue to the media playback system.

In yet another aspect, a non-transitory computer readable memory is provided. The non-transitory computer readable memory has stored thereon instructions executable by a computing device to cause the computing device to perform functions. The functions may include receiving, from a media playback system, (i) a request for an indication of at least one media item from a remote queue of media items, and (ii) an indication of a particular media item that is being played by a playback device of the media playback system. The functions may also include determining one or more media items from the remote queue. The determined one or more items may include the particular media item. The functions may further include sending an indication of the determined one or more media items from the remote queue to the media playback system.

As further indicated above, example techniques may involve playback policies of a queue. In one aspect, a method is provided. The method may involve receiving, from a media playback system, at least one request for an indication of one or more media items from a queue of media items. The method may also involve identifying one or more playback policies that are associated with the queue of media items. Each of the one or more playback policies may restrict at least one aspect of playback of at least one of the one or more media items. The method may further involve sending, to the media playback system, an indication of the identified one or more playback policies.

In another aspect, a device is provided. The device includes a network interface, at least one processor, a data storage, and program logic stored in the data storage and executable by the at least one processor to perform functions. The functions may include receiving, from a media playback system, at least one request for an indication of one or more media items from a queue of media items. The functions may also include identifying one or more playback policies that are associated with the queue of media items. Each of the one or more playback policies may restrict at least one aspect of playback of at least one of the one or more media items. The functions may further include sending, to the media playback system, an indication of the identified one or more playback policies.

In yet another aspect, a non-transitory computer readable memory is provided. The non-transitory computer readable memory has stored thereon instructions executable by a computing device to cause the computing device to perform functions. The functions may include receiving, from a media playback system, at least one request for an indication of one or more media items from a queue of media items. The functions may also include identifying one or more playback policies that are associated with the queue of media items. Each of the one or more playback policies may restrict at least one aspect of playback of at least one of the one or more media items. The functions may further include sending, to the media playback system, an indication of the identified one or more playback policies.

In yet another aspect, another method is provided. The method may involve receiving input data indicating a request to playback a queue of media items. The method may also involve sending a request for an indication of one or more media items from the queue of media items. The method may further involve receiving (i) an indication of at least one media item from the queue; and (ii) an indication of one or more playback policies that are associated with the queue of media items. Each of the one or more playback policies may restrict at least one aspect of playback of the at least one media item from the queue. The method may additionally involve causing a graphical interface to display (i) a graphical indication of the at least one media item, and (ii) a graphical indication that at least one playback policy is associated with the at least one media item.

In another aspect, a device is provided. The device includes a network interface, at least one processor, a data storage, and program logic stored in the data storage and executable by the at least one processor to perform functions. The functions may include receiving input data indicating a request to playback a queue of media items. The functions may also include sending a request for an indication of one or more media items from the queue of media items. The functions may further include receiving (i) an indication of at least one media item from the queue; and (ii) an indication of one or more playback policies that are associated with the queue of media items. Each of the one or more playback policies may restrict at least one aspect of playback of the at least one media item from the queue. The functions may additionally include causing a graphical interface to display (i) a graphical indication of the at least one media item, and (ii) a graphical indication that at least one playback policy is associated with the at least one media item.

In yet another aspect, a non-transitory computer readable memory is provided. The non-transitory computer readable memory has stored thereon instructions executable by a computing device to cause the computing device to perform functions. The functions may include receiving input data indicating a request to playback a queue of media items. The functions may also include sending a request for an indication of one or more media items from the queue of media items. The functions may further include receiving (i) an indication of at least one media item from the queue; and (ii) an indication of one or more playback policies that are associated with the queue of media items. Each of the one or more playback policies may restrict at least one aspect of playback of the at least one media item from the queue. The functions may additionally include causing a graphical interface to display (i) a graphical indication of the at least one media item, and (ii) a graphical indication that at least one playback policy is associated with the at least one media item.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A method comprising:
receiving, via a computing system over a network interface from one or more media playback systems that each comprise one or more respective playback devices, at least one respective request for an indication of one or more media items from a given cloud queue of media items, wherein the given cloud queue of media items is one of a plurality of cloud queues that are accessible to each of the one or more media playback systems via a wide area network;

identifying, via the computing system, one or more playback policies that are associated with the given cloud queue of media items, wherein each of the identified one or more playback policies restrict at least one aspect of playback of the media items queued in the given cloud queue; and causing, via the computing system over the network interface, the identified one or more playback policies to be applied to respective local queues of the one or more media playback systems, wherein each local queue (i) is stored on at least one respective playback device of the one or more media playback systems and (ii) includes the one or more media items from the given cloud queue of media items, and wherein causing the identified one or more playback policies to be applied to the one or more media playback systems comprises sending, via the computing system to the one or more media playback systems over the network interface, an indication of the identified one or more playback policies.

2. The method of claim 1, wherein the one or more media playback systems comprise a first media playback system and a second media playback system, and wherein receiving the at least one respective request for an indication of one or more media items from the given cloud queue of media items comprises:

receiving, from the first media playback system, a request for an indication one or more media items from the given cloud queue of media items; and receiving, from the second media playback system, a request for an indication of one or more media items from the given cloud queue of media items.

3. The method of claim 2, wherein identifying one or more playback policies that are associated with the given cloud queue of media items comprises:

identifying one or more first playback policies corresponding to the first media playback system, wherein each of the one or more first playback policies restrict at least one aspect of playback by the first media playback system of the media items queued in the cloud queue; and identifying one or more second playback policies corresponding to the second media playback system, wherein each of the one or more second playback policies restrict at least one aspect of playback by the second media playback system of the media items queued in the cloud queue.

4. The method of claim 3, wherein sending the indication of the identified one or more playback policies comprises sending an indication of the one or more first playback policies to the first media playback system; and wherein the method further comprises:

sending, over the network interface, an indication of the one or more second playback policies to the second media playback system.

5. The method of claim 2, wherein identifying one or more playback policies are associated with the given cloud queue of media items comprises:

identifying one or more first playback policies corresponding to a first user account that is associated with the first media playback system, wherein each of the one or more first playback policies restrict at least one aspect of playback by the first media playback system of the media items queued in the cloud queue; and identifying one or more second playback policies corresponding to a second user account that is associated with the second media playback system, wherein each of the one or more second playback policies restrict at least one aspect of playback by the second media playback system of the media items queued in the cloud queue.

6. The method of claim 1, wherein the given cloud queue is a first cloud queue of the plurality of cloud queues, and wherein receiving at least one respective request for an indication of one or more media items from the cloud queue comprises:

receiving, from a first media playback system, a request for an indication of one or more first media items from the first cloud queue; and wherein the method further comprises:

receiving, from a second media playback system, a request for an indication of one or more second media items from a second cloud queue of the plurality of cloud queues.

7. The method of claim 6, wherein identifying one or more playback policies that are associated with the cloud queue comprises identifying one or more first playback policies corresponding to the first cloud queue, wherein each of the one or more first playback policies corresponding to the first cloud queue restrict at least one aspect of playback of the media items queued in the cloud queue; and wherein the method further comprises:

identifying one or more second playback policies corresponding to the second cloud queue, wherein each of the one or more second playback policies restrict at least one aspect of playback of the media items queued in the cloud queue.

8. The method of claim 1, wherein the one or more playback policies restrict at least one of (i) skipping playback of one of the one or more media items, (ii) replaying a previously played media item of the one or more media items, (iii) seeking forward during playback of one of the one or more media items, (iv) seeking backward during playback of one of the one or more media items, or (v) replaying a currently playing media item of the one or more media items.

9. The method of claim 1, wherein the one or more playback policies restrict at least one of a shuffle option, a repeat option, a skip forward option, a skip backwards option, a seek forward option, or a seek backward option.

10. The method of claim 1, wherein the cloud queue indicates a pre-determined playback order of the media items, and wherein the one or more playback policies restrict modification of the pre-determined playback order of the media items.

11. A computing system comprising
a network interface;
at least one processor;
a data storage; and
a program logic stored in the data storage and executable by the at least one processor to:
receive, over the network interface from one or more media playback systems that each comprise one or more respective playback devices, at least one respective request for an indication of one or more media items from a given cloud queue of media items, wherein the given cloud queue of media items is one of a plurality of cloud queues that are accessible to each of the one or more media playback systems via a wide area network;

identify one or more playback policies that are associated with the given cloud queue of media items, wherein each of the identified one or more playback policies restrict at least one aspect of playback of the media items queued in the given cloud queue; and causing, via the computing system over the network interface, the identified one or more playback policies to be applied to respective local queues of the one or more media playback systems, wherein each local queue (i) is stored on at least one respective playback device of the one or more media playback systems and (ii) includes the one or more media items from the given cloud queue of media items, and wherein causing the identified one or more playback policies to be applied to the one or more media playback systems comprises sending, via the computing system to the one or more media playback systems over the network interface, an indication of the identified one or more playback policies.

12. A tangible non-transitory, computer-readable media having instructions encoded therein, wherein the instructions, when executed by one or more processors, cause a computing device to perform a method comprising:

receiving input data indicating a request to playback a particular cloud queue of media items on a given playback device that is different from the computing device, wherein the particular cloud queue is one of a plurality of cloud queues that are accessible to the given playback device via a wide area network;

sending, over a network interface to a cloud computing system, a request for an indication of one or more media items from the particular cloud queue of media items, wherein the request indicates a current track;

receiving, over the network interface from the cloud computing system, (i) an indication of at least one media item from the particular cloud queue, wherein the at least one media item includes the current track; and (ii) an indication of one or more playback policies that are associated with the particular cloud queue of media items, wherein each of the one or more playback policies restrict at least one aspect of playback of the at least one media item from the cloud queue; and causing a graphical interface to display (i) a graphical indication of the at least one media item, and (ii) a graphical indication that at least one playback policy is associated with the at least one media item.

13. The tangible non-transitory, computer-readable media of claim 12, wherein causing the graphical interface to display the graphical indication that at least one playback policy is associated with the at least one media item comprises causing the graphical interface to display a graphical indication of the at least one playback policy that is associated with the at least one media item.

14. The tangible non-transitory, computer-readable media of claim 12, wherein causing the graphical interface to display the graphical indication that at least one playback policy is associated with the at least one media item comprises displaying a graphical indication that one or more graphical controls that enable respective playback options are restricted, wherein the at least one playback policy restricts the playback options.

15. The tangible non-transitory, computer-readable media of claim 12, wherein the method further comprises determining that at least one of the one or more playback policies restricts display of media items from the cloud queue to (i) the current track of the cloud queue and (ii) one or more additional media items of the cloud queue; and wherein causing the graphical interface to display the graphical indication of the at least one media item comprises displaying a graphical indication of the current track and the one or more additional media items.

16. The tangible non-transitory, computer-readable media of claim 12, wherein the method further comprises:

detecting that the current track has changed from a first media item to a second media item; and based on detecting that the current track has changed from a first media item to a second media item, causing the graphical interface to display an indication of at least one playback policy that is associated with the second media item.

17. The tangible non-transitory, computer-readable media of claim 12, wherein causing the graphical interface to display (i) the indication of the at least one media item, and (ii) an indication that at least one playback policy is associated with the at least one media item comprises:

causing the graphical interface to display (i) a graphical indication of at least one first media item and at least one second media item, and (ii) a graphical indication of one or more first playback policies that are associated with the at least one first media item and a graphical indication of one or more second playback policies that are associated with the at least one second media item, wherein the one or more first playback policies are different from the one or more second playback policies.

18. The method of claim 1, wherein the given cloud queue is a first cloud queue of the plurality of cloud queues and the identified one or more playback policies are one or more first playback policies, wherein receiving at least one respective request for an indication of one or more media items from the given cloud queue of media items comprises receiving, from a particular media playback system, a request for an indication of one or more media items from the first cloud queue, and wherein the method further comprises:

receiving, from the particular media playback system, a request for an indication of one or more media items from a second cloud queue of the plurality of cloud queues;

identifying one or more second playback policies that are associated with the second cloud queue, wherein each of the identified one or more second playback policies restrict at least one aspect of playback of the media items queued in the second cloud queue, and wherein the one or more second playback policies are different from the one or more playback policies; and causing, via the computing system over the network interface, the identified one or more second playback policies to be applied to a local queue of the particular media playback system.

19. The method of claim 3, wherein causing, via the computing system over the network interface, the identified one or more playback policies to be applied to the one or more media playback systems comprises facilitating (i) first independent playback of the media items in the given cloud queue by the first media playback system according to the one or more first playback policies and, concurrently, (ii) second independent playback of the media items in the given cloud queue by the second media playback system according to the one or more second playback policies.

* * * * *